United States Patent
Seefeld et al.

(10) Patent No.: US 8,630,888 B2
(45) Date of Patent: Jan. 14, 2014

(54) SYSTEMS AND METHODS FOR ANALYZING A POTENTIAL BUSINESS PARTNER

(75) Inventors: Helge Burkhard Seefeld, Munich (DE); Thomas Morus Erich Luethi, München (DE)

(73) Assignee: Siemens Aktiengesellschaft, Munich (DE)

( * ) Notice: Subject to any disclaimer, the term of this patent is extended or adjusted under 35 U.S.C. 154(b) by 724 days.

(21) Appl. No.: 12/533,058

(22) Filed: Jul. 31, 2009

(65) Prior Publication Data
US 2011/0178836 A1  Jul. 21, 2011

Related U.S. Application Data

(60) Provisional application No. 61/137,579, filed on Jul. 31, 2008.

(51) Int. Cl.
*G06Q 10/00* (2012.01)
*G06Q 40/00* (2012.01)

(52) U.S. Cl.
USPC ........................................................ 705/7.28

(58) Field of Classification Search
USPC ........................................................ 705/7.28
See application file for complete search history.

(56) References Cited

U.S. PATENT DOCUMENTS

| | | | |
|---|---|---|---|
| 6,938,068 B1 | 8/2005 | Kraft et al. | 709/203 |
| 7,051,036 B2 | 5/2006 | Rosnow et al. | 707/102 |
| 7,321,864 B1 | 1/2008 | Gendler | 705/7 |
| 7,359,865 B1 * | 4/2008 | Connor et al. | 705/7.28 |
| 7,668,776 B1 | 2/2010 | Ahles | 705/38 |
| 7,685,013 B2 | 3/2010 | Gendler | 705/7 |
| 7,853,468 B2 | 12/2010 | Callahan et al. | 705/8 |
| 2001/0027389 A1 | 10/2001 | Beverina et al. | 703/22 |
| 2002/0082882 A1 * | 6/2002 | Perry et al. | 705/7 |
| 2002/0099578 A1 * | 7/2002 | Eicher et al. | 705/7 |
| 2003/0126049 A1 | 7/2003 | Nagan et al. | 705/35 |
| 2003/0135399 A1 * | 7/2003 | Ahamparam et al. | 705/7 |
| 2004/0015376 A1 | 1/2004 | Zhu et al. | 705/7 |
| 2004/0128186 A1 | 7/2004 | Breslin et al. | 705/10 |
| 2004/0181665 A1 | 9/2004 | Houser | 713/158 |
| 2004/0193907 A1 | 9/2004 | Patanella | 713/200 |
| 2005/0021360 A1 * | 1/2005 | Miller et al. | 705/1 |
| 2005/0071217 A1 | 3/2005 | Hoogs et al. | 705/10 |
| 2005/0114829 A1 | 5/2005 | Robin et al. | 717/101 |

(Continued)

OTHER PUBLICATIONS

Aguilar, M., et al., "Preventing Fraud and Corruption in World Bank Projects", The World Bank, May 2000.

(Continued)

*Primary Examiner* — Gurkanwaljit Singh
(74) *Attorney, Agent, or Firm* — King & Spalding LLP.

(57) ABSTRACT

A computer-implemented method is provided for facilitating a due diligence analysis of a potential business partner of a business entity. The method includes receiving key data regarding a potential business partner. The method further includes facilitating an analysis of the potential business partner, including receiving risk-related data from a user regarding risks associated with the potential business partner, automatically determining a risk class for the potential business partner based at least on the received risk-related data, automatically determining a set of due diligence questions to present to the user based at least on the automatically determined risk class for the potential business partner, and receiving due diligence data from the user in response to the set of due diligence questions. The method further includes facilitating an approval process for the received due diligence data.

19 Claims, 38 Drawing Sheets

(56) References Cited

U.S. PATENT DOCUMENTS

| | | | |
|---|---|---|---|
| 2005/0131818 A1 | 6/2005 | Desal et al. ................... | 705/40 |
| 2006/0020604 A1 | 1/2006 | Murez et al. ................... | 707/100 |
| 2006/0259471 A1 | 11/2006 | Droubie et al. ................ | 707/3 |
| 2006/0282291 A1 | 12/2006 | Runciman ...................... | 705/3 |
| 2007/0288355 A1* | 12/2007 | Roland et al. .................. | 705/38 |
| 2008/0103804 A1 | 5/2008 | Latta et al. ..................... | 705/1 |
| 2008/0281645 A1* | 11/2008 | Gaubatz et al. ................ | 705/7 |
| 2008/0281734 A1* | 11/2008 | Longe et al. ................... | 705/31 |
| 2009/0030751 A1 | 1/2009 | Barve et al. .................... | 705/7 |
| 2009/0030763 A1* | 1/2009 | Purtell ........................... | 705/7 |
| 2009/0228337 A1 | 9/2009 | Swindon et al. ............... | 705/10 |
| 2009/0248659 A1 | 10/2009 | McCool et al. ................. | 707/5 |
| 2009/0276381 A1 | 11/2009 | Boies et al. .................... | 706/12 |

OTHER PUBLICATIONS

Baccarini, D., et al., "The Risk Ranking of Projects: a Methodology", International Journal of Project Management, vol. 19, issue 3, pp. 139-145, Apr. 2001.

Baloi, A., et al., "Modelling Global Risk Factors Affecting Construction Cost Performance", International Journal of Project Management, vol. 21, issue 4, pp. 261-269, May 2003.

Asian Development Bank, "Guidelines for Implementing ADB's Second Governance and Anticorruption Action Plan", 44 pages, May 2008.

* cited by examiner

| DUE DILIGENCE LEVEL | ROLES | RESPONSIBILITIES |
|---|---|---|
| LOWER-LEVEL DUE DILIGENCE | RELEASER | VIEWS AND RELEASES OR REJECTS THE FRONT-END RISK ASSESSMENT AND DUE DILIGENCE QUESTIONNAIRE |
| | REVIEWER | PERFORMS A QUALITATIVE REVIEW OF THE FRONT-END RISK ASSESSMENT AND DUE DILIGENCE QUESTIONNAIRE |
| | APPROVER | APPROVES OR REJECTS THE BUSINESS PARTNER |
| MEDIUM-LEVEL DUE DILIGENCE | RELEASER | VIEWS AND RELEASES OR REJECTS THE FRONT-END RISK ASSESSMENT AND DUE DILIGENCE QUESTIONNAIRE |
| | REVIEWER | PERFORMS A QUALITATIVE REVIEW OF THE FRONT-END RISK ASSESSMENT AND DUE DILIGENCE QUESTIONNAIRE |
| | APPROVER | APPROVES OR REJECTS THE BUSINESS PARTNER |
| HIGHER-LEVEL DUE DILIGENCE | RELEASER | VIEWS AND RELEASES OR REJECTS THE FRONT-END RISK ASSESSMENT AND DUE DILIGENCE QUESTIONNAIRE |
| | REVIEWER | PERFORMS A QUALITATIVE REVIEW OF THE FRONT-END RISK ASSESSMENT AND DUE DILIGENCE; SUBMITS REQUEST FOR APPROVAL |
| | APPROVER | REVIEWS BP CDD RISK REPORT; APPROVES OR REJECTS THE BUSINESS PARTNER |

LOCAL MANAGEMENT   COMPLIANCE OFFICER   SCO, DCO, CUCO, OR CCO

To resume work on a Compliance Due Diligence user may press My compliance Due Diligence.

Select between three different attendance levels: "All", "To-Do", "Involved".

My CDD Overview
The result list shows the following details:
- CDD ID
- CDD Reference
- CDD Short Name
- CDD Originator
- Sector / Division / BU
- BUSINESS GROUP
- Risk Level
- CDD Status
- CDD last modified
- BP Name
- BP Country
- BP ID My Compliance Due Diligences Welcome | My Compliance Due Diligences | Search business partner | Add new business partner | Reports

My Compliance Due Diligences

[all ▼] 132

[Reset]  [Export CDD List]  [Search] 130  126

| CDD ID ▲ | CDD Reference | CDD Short Name | CDD Originator | Sector ▼ | Division ▼ | Business Group ▼ |
|---|---|---|---|---|---|---|
| | | | | | | |
| | | | | | | |
| << previous page | | | | | 1 2 3 4 5 6 7 8 9 10 11 12 | |
| 3364 | 42356105 | PVP | Smith, Jim | E | EPD | 530A |
| 3348 | 43307851 | ABC | Jones, Mary | OOP | OOP | 7000 |
| 3347 | 41379022 | Hermes | Simpson, Meg | SRE | SRE | 5310 |
| 3346 | 45214611 | SMVS | Parker, Peter | E | EPD | 4611 |
| 3344 | 44113497 | Big Mart | Parker, Peter | E | EPD | 4611 |
| 3327 | 35213023 | RTD | Jordan, Mike | I | IBT | 7000 |
| 3326 | 31100215 | RTD | Jordan, Mike | I | IIA | 7000 |
| 3394 | 31142687 | FS | Suzuki, Ichero | E | EFP | 5547 |
| << previous page | | | | | 1 2 3 4 5 6 7 8 9 10 11 12 | |

| Business Group Country ▼ | Risk Level ▼ | CDD Status ▼ | CDD Last Modified ▲ | BP Name ▼ | BP Country ▼ | BP ID ▲ |
|---|---|---|---|---|---|---|
| | | | (YYYY-MM-DD) | | | |
| CN | none | in Risk Assessment | 09.07.2008 11:22 AM | Chen Wan | China (CN) | 1160 |
| DE | high | in Due Diligence | 09.07.2008 10:04 AM | ABC Corp | USA (US) | 145 |
| RU | medium | Approved | 08.07.2008 04:49 PM | Jones Lang Lasalle | Russina Fed. (RU) | 1142 |
| CN | low | in Due Diligence | 08.07.2008 10:45 AM | Jas Forwarding (China) Co. Ltd. | China (CN) | 1141 |
| CN | low | in Approval | 08.07.2008 08:00 AM | Shanghai Muller Partner International Freight Co. Ltd. | China (CN) | 1121 |
| DE | high | in Due Diligence | 08.07.2008 01:15 PM | Al Arabien | Germany (DE) | 123 |
| DE | medium | in Due Diligence | 07.07.2008 05:50 PM | Al Arabien | Germany (DE) | 123 |
| CN | none | in Risk Assessment | 07.07.2008 04:11 AM | AVX | Argentina (AR) | 1100 | found 358 CDDs

Reset    Search next page > >

13 14 15 16 17 18 19 20 21 22 23 24

120

122

124

FROM FIG. 7A

Sort results
To sort search results, press the little arrow at the respective criteria.

Search criteria
To sort the search results, press the little arrow in the headline. Alternatively, the drop down menu can be used for selection of the respective criteria.

Search Business Partner

Welcome | My Compliance Due Diligences | Search business partner | Add new business partner | Reports ← 102

Business Partners found 289 BPs        [Create new BP]   [Reset]   [Search]  ← 148

| ID ▾ 👤 | Type ▴ 👤 of BP | Name ▴ 👤 | Country ▴ 👤 | Show only my BPs 👤 ☐ | Max. ▾ 👤 risk level | Number ▾ 👤 of CDDs |
|---|---|---|---|---|---|---|
| | | | 142 | | 146 | |
| << previous page | | 1 2 3 4 5 6 7 8 9 10 11 12 13 14 15 16 17 18 19 20 | | | | next page >> |
| 1144 | legal | Web Based Training | Germany (DE) | | | 0 🔍 ✏️⊕ |
| 1143 | legal | Test | Andorra (AD) | | | 0 🔍 ✏️⊕ |
| 1142 | legal | Jones Lang Lasalle | Russian Fed. (RU) | | medium | 1 🔍 ✏️⊕ |
| 1141 | legal | Jas Forwarding (China) Co. Ltd. | China (CN) | | low | 1 🔍 ✏️⊕ |
| 1140 | legal | Wuxi Friend Logistics Services | China (CN) | 144 | low | 1 🔍 ✏️⊕ |
| 1121 | legal | Shanghai Muller Partner International Freight Co. Ltd. | China (CN) | | low | 1 🔍 ✏️⊕ |
| 1120 | legal | Internal Test - 07-07-2008 | Germany (DE) | | high | 1 🔍 ✏️⊕ |
| 1100 | legal | AVX | Argentina (AR) | | none | 1 🔍 ✏️⊕ |
| 1080 | legal | Atisreal GmbH | Germany (DE) | | low | 1 🔍 ✏️⊕ |
| 1060 | legal | Atisreal | Germany (DE) | | low | 1 🔍 ✏️⊕ |

Magnifier Glass
To view all Compliance
Due Diligences for the
business partner.

New CDD
To start a new Compliance
Due Diligence on an
existing BP user presses
the pencil button.

Number of CDDs
Entered in the BPC-Tool.

Welcome | My Compliance Due Diligences | Search business partner | Add new business partner | Reports Search Business Partner

Business Partners  found 289 BPs

| Type of BP | Name | | Country | Show only my BPs | Max. risk level | Number of CDDs | Create new BP | Reset | Search |

<< previous page   1 2 3 4 5 6 7 8 9 10 11 12 13 14 15 16 17 18 19 20   next page >>

| ID | Type | Name | Country | Max. risk level | Number of CDDs |
|---|---|---|---|---|---|
| 1144 | legal | Web Based Training | Germany (DE) | | 0 |
| 1143 | legal | Test | Andorra (AD) | | 0 |
| 1142 | legal | Jones Lang Lasalle | Russian Fed. (RU) | medium | 1 |
| 1141 | legal | Jas Forwarding (China) Co. Ltd. | China (CN) | low | 1 |
| 1140 | legal | Wuxi Friend Logistics Services | China (CN) | low | 1 |
| 1121 | legal | Shanghai Muller Partner International Freight Co. Ltd. | China (CN) | low | 1 |
| 1120 | legal | Internal Test - 07-07-2008 | Germany (DE) | high | 1 |
| 1100 | legal | AVX | Argentina (AR) | none | 1 |
| 1080 | legal | Atisreal GmbH | Germany (DE) | low | 1 |
| 1060 | legal | Atisreal | Germany (DE) | low | 1 |
| 1040 | legal | NG Trade Internacional LTDA | Brazil (BR) | high | 1 |
| 1020 | legal | MedSurg Specialty Devices | USA (US) | medium | 1 |

<< previous page   1 2 3 4 5 6 7 8 9 10 11 12 13 14 15 16 17 18 19 20   next page >>

Legend: 🔍 View all Compliance Due Diligences for the business partner.   ✏️ New Compliance Due Diligence for the business partner.

Search Business Partner

Welcome | My Compliance Due Diligences | Search business partner | Add new business partner | Reports

Compliance Due Diligences for BP  found 5 CDDs  ← Back to Business Partner List

| CDD ID ▼ | CDD Reference | CDD Short Name | CDD Originator | Sector ▲ | Division ▲ | Company Entity | Risk Level | CDD Status | CDD Last Modified ▼ | BP Name | BP Country | BP ID | |
|---|---|---|---|---|---|---|---|---|---|---|---|---|---|
| 3028 | 41235697 | WBT | Monroe, Mary | OOP | OOP | ABC 7000 | high | Approved | 25.06.2008 02:12 PM | ABC Corp | USA (US) | 145 | 🔍 |
| 2845 | 43235613 | WBT | Blount, Dylan | OOP | n/a | 7000 | high | Approved | 12.06.2008 10:59 AM | ABC Corp | USA (US) | 145 | 🔍 |
| 1546 | 40935221 | RTD | Sutton, Lori | I | IMO | 7471 | medium | in Review | 15.05.2008 11:17 AM | ABC Corp | USA (US) | 145 | 🔍 |
| 1384 | 49980732 | F20 | Owens, Troy | OOP | OOP | 7000 | high | Approved | 09.05.2008 10:04 AM | ABC Corp | USA (US) | 145 | 🔍 |
| 1307 | 45504558 | RTD | Williams, Chloe | OOP | OOP | 7000 | high | Approved | 08.05.2008 06:44 PM | ABC Corp | USA (US) | 145 | 🔍 ← 162 |

↙ 160

CDD Key Data
All relevant Key Data:
- Originator
- Sector
- Division
- Business Unit
- Risk Level
- CDD Status Is presented in the result list.

Magnifier Glass
If user is assigned to a CDD (either as Originator or Viewer) user may click on the magnifier glass to get detailed information about each CDD. According to the user's rights he can either contribute to the CDD or view the current status.

Welcome | My Compliance Due Diligence | Add new business partner | Search business partner | Add new business partner | Reports ← Back to Business Partner List    [Save] ← 172

Business Partner Key Data

BP ID ← 174

Type of BP: *  [legal ▼]

Name: *

Street and house number: *

ZIP-code: *

Country: *  [▼]

Phone: *

Website:

178 — Created by:

176 — IFA:

City: *

State/District:

Fax:

Contacts: 1. Firstname:  Lastname:  eMail:

2. Firstname:  Lastname:  eMail:

3. Firstname:  Lastname:  eMail:

Fields marked with an asterisk (*) are mandatory fields.

170

102

BP ID: This is a unique identifier for the Business Partner (BP) which will be assigned automatically by the tool after saving.

Type of BP: Choose whether the BP is a legal entity or a natural person.

Name of BP: Enter the complete name of the BP. This field differs depending on Type of Business Partner (i.e. natural or legal). Fields marked with an (*) are mandatory fields.

Created by: The Originator of a BP will be displayed here automatically after saving.

IFA: Unique CMD Key Identifier for Accounts.

Data
After the Save button has been pressed, input fields can be changed at any time until the CDD has been submitted for release. Locked data will be shown grey.

Change Log
Every action and change will be logged in the change log. The respective change log will only be displayed to assigned users.

Start New Compliance Due Diligence
Regardless of whether it is an existing BP entry or a new BP entry, to start press the button New Compliance Due Diligence

Find CDDS
To get a complete list of all conducted CDDs on this BP press Find CDDS Add new Business Partner - Saved

| Welcome | My Compliance Due Diligences | Search business partner | Add new business partner | Reports |

Business Partner Key Data

[← Back to Business Partner List]  [🔍 Find CDDs]  [New Compliance Due Diligence]  [Save]

— 172

BP ID: 720
Type of BP:* legal ▼
Name:* Web Based Training         Created by: Mike Jones
Street and house number:* WBT Street     IFA:
ZIP-code:* 12345
Country:* USA (US) ▼                City:* Web City
Phone:* +1 123 123 123              State/District:
Website:                             Fax:

Contacts: 1. Firstname: _____ Lastname: _____ eMail: _____
         2. Firstname: _____ Lastname: _____ eMail: _____
         3. Firstname: _____ Lastname: _____ eMail: _____

Fields marked with an asterisk (*) are mandatory fields.

Change Log (DD.MM.YY) Show overall history
12.06.08 10:16 CET: DD, Test - CREATE          — 180

CDD ID:
Unique identifier for the Compliance Due Diligence which will be assigned automatically by the tool after saving.

Reference:
User enters a reference for his own purpose.

Organization
Use the available drop-down lists to select the Sector, Division and Business Unit of the contracting entity. Enter the ABC Company Entity Number of the responsible entity. Selection of multiple levels possible.

Navigation Bar 202

New Compliance Due Diligence — 200

Welcome | My Compliance Due Diligences | Search business partner | Add new business partner | Reports

[0 CDD Key Data] [1 Risk Assessment] [2 Due Diligence] [3 Release] [4 Review] [5 Approval]

Compliance Due Diligence Key Data

← Back to BP search    Save — 208

CDD ID:

Reference:

— 204

Sector:*

Business Unit:*

Business Group:*      Division:*

Short Name:

Description:*

Fields marked with an asterisk (*) are mandatory fields.

Key Data overview 222

Notification
Once the CDD Key Data has been saved, a notification will be shown to confirm the transaction.

Mandatory Description
Provide a brief and precise description of the activities/operations which will be performed by the BP.

Screening Authorization
The screening authorization is a standardized template which needs to be signed by the BP. In the screening authorization the BP authorizes XYZ Corp to conduct a complete pre-employment and/or background investigation to prove his suitability and trustworthiness to work for XYZ Corp.
User can upload a scan of the signed authorization.

| BP ID | Business Partner Name | ABC Company Entity | CDD ID | CDD Short Name | Organization | Workflow Status | Risk Level |
|---|---|---|---|---|---|---|---|
| 145 | ABC Corp | 7000 | 3348 | Reg. Project | Other Operations / Other Operations / Governance & Control | in Risk Assessment | none |

• Compliance Due Diligence Key Data was successfully saved!

| 0 CDD Key Data | 1 Risk Assessment | 2 Due Diligence | 3 Release | 4 Review | 5 Approval |

⇐ Back to BP search    Save — 230

Compliance Due Diligence Key Data

CDD ID: 3348 — 210
Reference: [Web Based Training ▼]
Sector:* [Other Operations ▼]    Division:* [Other Operations ▼]
Business Unit:* [Governance & Control ▼]    204
Business Group:* [7000]    (XYZ Corp, DE)
Short Name: [WBT CDD]
Description:* [WBT CDD]

Upload Screening authorization: [          ] [Browse...]    224
Comment to screening authorization: [          ]

[Upload Document]

Fields marked with an asterisk (*) are mandatory fields.

New Compliance Due Diligence - Saved

| 0 CDD Key Data | 1 Risk Assessment | 2 Due Diligence | 3 Release | 4 Review | 5 Approval |

Compliance Due Diligence Key Data — 220

⬅ Back to BP search | Save

CDD ID: 3366
Reference: Test
Sector:* Industry ▼
Business Unit:* ICI Technical ▼    Division:* Central Industry ▼
Business Group:* 7000   (XYZ Corporation AG, DE)
Short Name: Test
Description:* Test
Upload Screening authorization: [BROWSE...]   [Upload Document]
Comment to screening authorization: 226

[Cancel Compliance Due Diligence] → Cancel Compliance Due Diligence As long as the CDD has not been submitted for Release the Originator may cancel the Compliance Due Diligence.

Fields marked with an asterisk (*) are mandatory fields.

Authorized Users

| | Email Address | | Name |
CDD Rule
ORIGINAL (CDD Creator)    DDTest1            Test DD
COORGINATOR ▼              228       🔍

[Add User]

Authorized Users
The Originator of the CDD is set by default and cannot be changed. To allow other colleagues editing rights to the CDD (e.g. for support purposes), select Co-Originator and enter the e-mail address.
To allow read-only access to another person, select Viewer. Press Add user if further entries are necessary.

FIG. 15

Front End Risk Assessment

| 0 CDD Key Data | 1 Risk Assessment | 2 Due Diligence | 3 Release | 4 Review | 5 Approval |

Front End Risk Assessment    ☒ Show Risk Assessment Report    ← Back to BP search    Risk Level: [n/a] — 248

- To complete the risk assessment, you have to answer all questions below.
- Colored comment fields are mandatory.

Risk Classifiers — 242    [Save]    [Complete] — 246

| Ref | Question | Help | Answer | Comment |
|---|---|---|---|---|
| A | Previous experience with the Business Partner — 240 | ⓘ 244 | ○ It is a new Business Partner<br>○ It is an existing Business Partner<br>○ Not known    Guidance & Implication Click on the light bulb to receive further guidance. Press the exclamation mark to receive an explanation regarding the implications on the risk. | Complete To finish the Risk Assessment and generate the appropriate Risk Level, press Complete. This action can only be performed, once all sections have been completed. |
| D | Has the Business Partner been recommended by government officials? | ⓘ | ○ Yes<br>○ No<br>○ Not known | |
| E | What services will be performed by the Business Partner / what is the purpose of the relationship? | ⓘ | □ Business Partner purchases and resells XYZ Corp products on own account.<br>□ Business Partner promotes and sells XYZ Corp products on behalf of XYZ Corp. The contract relating to the sale of products is established between XYZ Corp and the third party.<br>□ Business Partner assists XYZ Corp in obtaining sales or orders. The contract relating to the sale of products is established between XYZ Corp and the third party.<br>□ XYZ Corp and Business Partner agree to cooperate in a common activity to achieve a commercial or a common goal.<br>□ XYZ Corp and Business Partner jointly set up a new entity for the purposes of undertaking economic activities.<br>□ Business Partner acts on behalf of XYZ Corp and processes / assists the customs clearance transactions either exclusively or in combination with the transportation of goods.<br>□ Business Partner acts a service provider to XYZ Corp in tax, legal or financial matters. | |

Risk Classifier Questions Select one or more answers to each question, and provide additional comments if helpful.

Business Partner Due Diligence

| 0 CDD Key Data | 1 Risk Assessment | 2 Due Diligence | 3 Release | 4 Review | 5 Approval |

⬅ Back to My Compliance Due Diligences

[ ] Show Due Diligence Report — 272

Show only questions mandatory for the current risk level ▼

DDQ Subject Areas
The Due Diligence Questionnaire (DDQ) is divided into five subject areas:
A: Business Information
B: Business Activities
C: Litigation
D: References
E: Signed Certification To display the questions of another subject area, select the respective entry.

[ Save ]

- A.1 ⚠ Business Information: General business information
- A.II ⚠ Business Information: Internet and sanction party check
- A.III ⚠ Business Information: Government connections
- A.IV ⚠ Business Information: Bank account information
- B.I ⚠ Business Activities: Information on prospective business relationship
- B.II ⚠ Business Activities: Potential conflicts of interest and compliance concerns
- B.III ⚠ Business Activities: Further external information on the business
- C. Litigation
- D. References
- E. ⚠ Signed Certification / Submit Due Diligence

— 278

A.1 Business Information: General business information — 274

| Ref | Question | Answer |
|---|---|---|
| A1 ⚠ | Using information provided by the business partner and information obtained through an internet search and other available documents, please provide any other names by which the entity or individual is currently known or has been known within the last 10 years. | [ ] not applicable<br><br>Previous Name: [_____] [▼]<br><br>Sanctioned Party List has been checked: [ ]   Change Date: [_____] (YYYY-MM-DD)<br><br>Explanation: [_____]<br><br>276 |

— 270

To receive a summary report of DDQ please press Show Due Diligence Report

Questions
All mandatory questions for the corresponding Risk Level are shown by default and highlighted with an exclamation mark in a yellow triangle. To show all questions, choose Show all questions in the drop-down menu.

Due Diligence Questionnaire

Due Diligence Questionnaire

A.1 Business Information: General business information

| Ref | Question | Answer | Sanctioned Party & Internet Check |
|---|---|---|---|
| A1 | Using information provided by the business partner and information obtained through an internet search and other available documents, please provide any other names by the entity or individual is currently known or has been known within the last 10 years. Include names of other entities which have merged with or into the entity during the last 10 years. Check all names against the Sanctioned Party List and record the results regarding the outcome of this check in the relevant column. Confirm that a Google or other suitable internet search has been performed on all names on the list and on any additional names that may surface as a result of the search. Document the results of the internet search. | ☐ not applicable<br><br>Previous Name: ☐<br>Change Date: ☐ (YYYY-MM-DD)<br>Sanctioned Party List has been checked: ☐<br>Explanation: ☐<br><br>Internet search has been performed: ☐<br>Explanation: ☐<br><br>[Delete entry] [Add entry] — 284 | User checks the box if he has performed the check as described in the light bulb and chooses the appropriate result in the drop-down list. User should provide an explanation, if he found any relevant adverse entry. |
| A1.1 | Please upload screenshots of the internet searches performed for Question A1 here. | [Browse....] ☐ (YYYY-MM-DD)<br>[Upload Document] | |
| A2 | Provide the date the entity was established and an explanation if the date does not match external documentation. | | To add a further entry to the list or to delete an entry. |

[Save]

Release

| BP ID | Business Partner Name | Business Group | CDD ID | CDD Short Name | Organization | Workflow Status | Risk Level |
|---|---|---|---|---|---|---|---|
| 145 | 🔍 ABC Corp | 7000 | 3348 | Reg. Project | Other Operations<br>Other Operations<br>Governance & Control | in Release | high |

— 222    300

Release — The originator (CDD creator) is not authorized to release the CDD for review. Therefore the originator only has read-only access to the review and approval forms.

- You do not have a release permission for this CDD, therefore the form is read-only!

| 0 CDD Key Data | 1 Risk Assessment | 2 Due Diligence | 3 Release | 4 Review | 5 Approval |

Summary Report — To show a pdf-summary report.

📄 Show Summary Report — 302

⇐ Back to My Compliance Due Diligences

Release

Releaser from local management : Lee Stevens 📇

*You are not authorized to release this CDD!*

History — 304

| Action | User | Date | Comment |
|---|---|---|---|
| Released for Review | Rich Miller 📇 | 14.07.2008 04:24 PM | |

Releaser — The authorized releaser(s) within local management will be shown here as selected by the originator.

History — Every action undertaken by the releaser(s) will be shown in the history section.

FIG. 24

Request for clarification
In case of any open questions regarding the Risk Assessment or the Due Diligence the releaser has the possibility to send the CDD back to the originator with a request for clarification including a comment. The originator has the possibility to clarify these open items afterwards and re-submit the CDD for release.

Release CDD for review
The releaser has the possibility to release the CDD for review.

300

Stop CDD process
The releaser has the possibility to stop the CDD process finally in case of any doubtful findings. In this case, the BP is finally rejected.

| 0 CDD Key Data | 1 Risk Assessment | 2 Due Diligence | 3 Release | 4 Review | 5 Approval |

Release

Releaser from local management ⊙    local management 🗔    ⇦ Back to My Compliance Due Diligences    🗎 Show Summary Report The following compliance officers Business Group 7000 have been found.
Please choose one of them as the reviewer for this CDD:
 ⊙ Responsible Compliance Officer:
 ○ Deputy Compliance Officer:
 ○ Deputy Compliance Officer:

Please add here the persons who want to be informed about the case and who are normally not involved in the process. The respective persons will receive an e-mail and will be granted viewer rights on the case.

Enter email address: [ ]
    Enter email address: [ ]
    Enter email address: [ ]

I have carefully reviewed the information and documentation related to the proposed business partner, and when indicated by the instructions or my own judgement, have conducted an independent investigation of the facts. Based on my review and assessment performed in accordance with the instructions and guidance in the due diligence tool, ▣   I believe that the proposed business partner is acceptable to provide the proposed services, as defined in the (business proposal), to XYZ Corporation or in connection with a XYZ Corporation related project.     [Release CDD for review]

□   Before I can confirm the acceptability of the business partner for the proposed services, the following steps have to be taken:     [Clarification of CDD with originator]

▣   I do not believe that the proposed business partner is acceptable under any circumstances.     [Stop CDD process]

310

History

| Action | User | Date | Comment |
|---|---|---|---|
| Released for review | Rick James | 14.07.2008 04:24 PM | |

FIG. 27

Approve

| 0 CDD Key Data | 1 Risk Assessment | 2 Due Diligence | 3 Release | 4 Review | 5 Approval |

☒ Show Summary Report    ⇐ Back to My Compliance Due Diligences

Approver from Compliance Organization  👥  Sandy Lomers (SCO) 📧

340 →

Please add here the persons who you want to be informed about the case and who are normally not involved in the process. The respective persons will receive an e-mail and will be granted viewer rights on the case.

Enter email address: [           ]
Enter email address: [           ] 🔍
Enter email address: [           ]

344

◉  I have carefully reviewed the information and documentation related to the proposed business partner, and when indicated by the instructions or my own judgement, have conducted an independent investigation of the facts. Based on my review and assessment performed in accordance with the instructions and guidance in the due diligence tool, I believe that the proposed business partner is acceptable to provide the proposed services, as defined in the (business proposal), to XYZ Corporation or in connection with a XYZ Corporation related project.     [ Approve ]

○  Before I can confirm the acceptability of the business partner for the proposed services, the following steps have to be taken:     [ Clarification of CDD with reviewer ]
                                                                                                                                    [ Clarification of CDD with releaser ]
346                                                                                                                                  [ Clarification of CDD with originator ]

◉  I do not believe that the proposed business partner is acceptable under any circumstances.     [ Disapprove ]

History

| Action | User | Date | Comment |
|---|---|---|---|
| Sent back to Due Diligence (low) | Fred Jones | 14.07.2008 04:24 PM | Need additional documentation |

Approval
The approver has the possibility to approve the BP

Request for clarification
In case of any open questions regarding the Risk Assessment or the Due Diligence the approver also has the possibility to send the CDD to the reviewer, releaser or originator.
The reviewer, releaser or approver has the possibility to clarify the open items and re-submit the CDD for approval.

Stop CDD process
The approver has the possibility to reject the BP and stop the CDD process. In this case the BP is finally rejected

FIG. 29

Application for Reuse (Originator's View)
The Reuse functions starts with performing a new CDD on a Business
Partner, where a CDD for this Business Partner has been already approved Option 1: Search Business Partner Function

| Business Partners | Show only my BPs ☐ | found 1 BPs | | Export BP List | Create new BP | Reset | Search |
|---|---|---|---|---|---|---|---|
| BP ID | Type of BP | Name | Country | Local Code | Max. risk level | Number of CDDs | |
| | ▼ | | ▼ | | | | |
| 1120 | legal | ABC Corp | Germany (DE) | | high | Show 1 CDDs | |

↖ 140

370

In the "Search Business Partner
Screen" user can start a new CDD
for an existing Business Partner by
clicking on the "New CDD" symbol In the Business Partner Key Data, user can start a
new CDD for an existing Business Partner by clicking
on the "New Compliance Due Diligence Button"

Option 2: Business partner Key Data

| Business Partner Key Data | ← Back to Business Partner List | 🔍 Find CDDs | ✎ New Compliance Due Diligence | Save |
|---|---|---|---|---|

Search for Business Partner address data in CMD

BP ID: 1120       Created by: Test DD (07.07.08 09:45)

Type of BP:* legal ▼      IFA:

Name:* ABC Corp

Street and
house number:* 5 Main St.

Postal Code:* 51234      City:* Springfield

↖ 170

380

Application for Reuse (Originator's Review)

The CDD Key Data for the new CDD has to be completed in order to document the XYZ Corp who is performing the CDD and the scope of work being provided by the Business Partner (ABC Corp)

| 0 CDD Key Data | 1 Risk Assessment | 2 Due Diligence | 3 Release | 4 Review | 5 Approval |

404 — 1 Risk Assessment tab

After Completing the CDD Key Data click on the section "Risk Assessment"

Compliance Due Diligence Key Data

⇐ Back to Business Partner Key Data     Save — 402

Complete the CDD Key Data by clicking on the Save Button

CDD ID :
Reference: Contract A1500987
Sector:* Energy
Business Unit:* - performed on division/sector level -
Business Group:* 7092       Division:* Oil & Gas
Short Name: Biotherm Project
Description:* New CDD on an existing Business Partner for presentation of the Re-use function

Application for Reuse (Originator's View)

After completion of the risk assessment the system offers the possibility to the Originator to apply for Reuse. This option is only visible if the risk categorization of the new risk assessment fulfills certain prerequisites (e.g. same or lower risk) in comparison with the risk assessment of the existing CDD — User can also proceed with his CDD without using the Reuse function by clicking on the Due Diligence section Application for Reuse
To apply for reuse, user selects a Compliance Officer of his Business Group and explains the reasons for his request. User can submit his request to the Compliance Officer with the "Request Reuse" Button.

| 0 CDD Key Data | 1 Risk Assessment | 2 Due Diligence | 3 Release | 4 Review | 5 Approval |

Front End Risk Assessment ☒ Show Risk Assessment Report ⇦ Back to My Compliance Due Diligences    Risk Level: high Reuse of existing CDDs is possible Already approved Compliance Due Diligences for this Business Partner have been found.
To request a reference to / the reuse of the existing data please select a Compliance Officer in the list below and provide a short explanation of the reason for the request.

○ Responsible Compliance Officer: Joan Pratt (joan.pratt@xyzcorporation.com)
◉ Deputy Compliance Officer: Steve Brown (steve.brown@xyzcorporation.com)

Please explain the reason for your request and specify which approved due diligence you want to reuse (if applicable)

[New contract with BP - different work scope]

[Request Reuse] — 434

432

- To complete the risk assessment, you have to answer all questions below
- Colored comment fields are mandatory

Risk Classifiers

| Ref | Question | Help | Answer | Comment |
|---|---|---|---|---|
| A | Previous experience with the Business Partner | ⊙ | ○ It is a new Business Partner<br>◉ It is an existing Business Partner<br>○ Not known | [Reopen] |

Application for Reuse (Originator's View)

After submitting the CDD for reuse to the Compliance Officer, the workflow status changes to "Reuse requested" and the Reuse section in the workflow process becomes visible

| BP ID | Business Partner Name | Business Group | CDD ID | CDD Short Name | Organization | Workflow Status | Risk Level |
|---|---|---|---|---|---|---|---|
| 145 | ABC Corp | 7092 | 7750 | Biotherm Project | Energy<br>Oil & Gas<br>- performed on division/sector level - | Reuse requested | high |

↙ 222

Workflow Status changes to "Reuse requested" and the Reuse-Section becomes accessible

| 0 CDD Key Data | 1 Risk Assessment | Reuse 440 |

450

Reuse of existing CDD has been requested

Comments

| User | Date | Comment |
|---|---|---|
| user 1 | 05.05.2009 04:40 PM | New Contract with BP - different work scope |

[← Back to My Compliance Due Diligences]

[Add Comment]

Documents

[Browse]

[Upload Document]

History

| Action | User | Date | Comment |
|---|---|---|---|
| Request reuse | Tim Miller | 05.05.2009 04:39 PM | |

Originators have access to the Reuse Screen immediately after submitting the CDD for Reuse. However, before adding comments or uploading documents, user should wait for the Compliance Officer's reaction. A possible scenario how to proceed in case of a reaction of the Compliance Officer is described in FIG. 33. A request for Reuse can only be canceled by the Compliance Officer but not by an originator.

Application for Reuse (Compliance Officers View)

| BP ID | Business Partner Name | Business Group | CDD ID | CDD Short Name | Organization | Workflow Status | Risk Level |
|---|---|---|---|---|---|---|---|
| 1120 | 🔍 ABC Corp | 7092 | 7751 | Biotherm Project | Energy Oil & Gas - performed on division/sector level - | Reuse requested | high |

→ 222

| 0 CDD Key Data | 1 Risk Assessment | Reuse |

Reuse of existing CDD has been requested — 526

Steve Brown (CL CO CU) 📧 [Change]

*With the Change Button user can assign the approval role to another CO registered for the Business Group*

Please select the CDD to use for the reuse/reference:

| | CDD ID | Short name | Risk level | Sector | Division | Business Group |
|---|---|---|---|---|---|---|
| ○ | 3325 | Reg. Project | high | OOP | OOP | 7000 |

530

← Back to My Compliance Due Diligences — 528

Expiration Date 🔍
11.07.2010

[Release reference]
[Copy data]
[Reject reuse]

A reference to an existing CDD has been requested.
○ Approve reference
   I nearby confirm the reference to an existing CDD.
○ Approve copy
   I nearby confirm the copy of not time sensitive data of an existing CDD.
○ Disapprove copy and reference
   I hereby disapprove the request for reference of copy.

Comments

| User | Date | Comment |
|---|---|---|
| Tim Miller 📧 | 06.05.2009 05:40 PM | New contract with BP - different work scope |

◀ ▶

[                    ]  [Add Comment]

524

Documents

[Browse]  [                    ]  [Upload Document]

520 ously ad hoc and non-uniform across a business entity and over time. In addition, typical systems do not provide a consistent or efficient process for presenting approval decisions for potential business partners to appropriate decision makers within a business, for example, based on the risks associated with such potential business partners.

US 8,630,888 B2

SYSTEMS AND METHODS FOR ANALYZING A POTENTIAL BUSINESS PARTNER

CROSS-REFERENCE TO RELATED APPLICATIONS

This application claims the benefit of U.S. Provisional Application No. 61/137,579 filed on Jul. 31, 2008, entitled "BUSINESS PARTNER COMPLIANCE TOOL (BPC-TOOL)", which is incorporated herein in its entirety.

TECHNICAL FIELD

The present disclosure relates generally to the field of analyzing potential business partners, including performing risk analyses of potential business partners.

BACKGROUND

As businesses entities become larger and more complex, coupled with the rise of globalization and complex international business relationships, particular risks associated with potential business partners, such as the risks of insolvency, bribery, or corruption by a business partner, remain a substantial concern. Current systems for analyzing and managing such risks are typically ad hoc and non-uniform across a business entity and over time. In addition, typical systems do not provide a consistent or efficient process for presenting approval decisions for potential business partners to appropriate decision makers within a business, for example, based on the risks associated with such potential business partners.

SUMMARY

In some embodiments of the present disclosure, a computer-implemented method is provided for facilitating a due diligence analysis of a potential business partner of a business entity. The method includes receiving key data regarding a potential business partner. The method further includes facilitating an analysis of the potential business partner, including receiving risk-related data from a user regarding risks associated with the potential business partner, automatically determining a risk class for the potential business partner based at least on the received risk-related data, automatically determining a set of due diligence questions to present to the user based at least on the automatically determined risk class for the potential business partner, and receiving due diligence data from the user in response to the set of due diligence questions. The method further includes facilitating an approval process for the received due diligence data.

In some embodiments of the present disclosure, logic instructions stored in computer-readable media and executable by a processor for facilitating a due diligence analysis of a potential business partner of a business entity are provided. The logic instructions may include instructions for receiving key data regarding a potential business partner; instructions for receiving risk-related data from a user regarding risks associated with the potential business partner; instructions for automatically determining a risk class for the potential business partner based at least on the received risk-related data; instructions for automatically determining a set of due diligence questions to present to the user based at least on the automatically determined risk class for the potential business partner; instructions for receiving due diligence data from the user in response to the set of due diligence questions; and instructions for facilitating an approval process for the received due diligence data.

In some embodiments of the present disclosure, a computer-implemented method for facilitating a due diligence analysis of a potential business partner of a business entity is provided. The method includes facilitating a first due diligence analysis of a potential business partner and later facilitating a second due diligence analysis of the same potential business partner. Facilitating the first due diligence analysis of the potential business partner includes receiving first risk-related data regarding the potential business partner; automatically determining a first risk class for the potential business partner based at least on the first risk-related data; receiving first due diligence data; and facilitating an approval process of the received first due diligence data. Facilitating the later, second due diligence analysis of the potential business partner includes receiving second risk-related data regarding risks associated with the potential business partner; automatically determining a second risk class for the potential business partner based at least on the second risk-related data; comparing the second risk class to the first risk class; based on a determination that the second risk class is the same or lower than the first risk class, allowing at least a portion of the first due diligence data to be reused for the second due diligence analysis; receiving second due diligence data including the reused first due diligence data; and facilitating an approval process of the second due diligence data.

BRIEF DESCRIPTION OF THE DRAWINGS

Some embodiments of the disclosure may be understood by referring, in part, to the following description and the accompanying drawings wherein:

FIG. 3 illustrates the various roles and responsibilities for individuals performing the various steps of the approval phase of the due diligence process, based on the relevant due diligence level determined for the potential business partner, according to certain embodiments of the invention;

FIGS. 6A-6B illustrate an example "my compliance due diligences" screen generated by the BPCDD tool, according to certain embodiments of the invention;

FIGS. 7-9 illustrate example screens generated by the BPCDD tool for searching for an existing business partner, according to certain embodiments of the invention;

FIGS. 10-11 illustrate example screens generated by the BPCDD tool for adding a new business partner into the BPCDD tool 18, according to certain embodiments of the invention;

FIGS. 12-14 illustrates an example screen generated by the BPCDD tool for entering key data regarding the due diligence, according to certain embodiments of the invention;

FIG. 15 illustrates an example risk assessment questionnaire generated by the BPCDD tool, according to certain embodiments of the invention;

FIGS. 18-21 illustrate screenshots of an example due diligence questionnaire generated by the BPCDD tool, according to certain embodiments of the invention;

FIGS. 22-24 illustrate an example screen for facilitating the release step of an approval phase of the due diligence process, according to certain embodiments of the invention;

FIGS. 27-28 illustrate an example screen for facilitating the approval step of the approval phase of the due diligence process, according to certain embodiments of the invention; and FIGS. 29-36 illustrate example screens generated by the BPCDD tool 18 for facilitating a "due diligence reuse" function, according to certain embodiments of the invention.

DETAILED DESCRIPTION OF THE DRAWINGS

Figure 1:
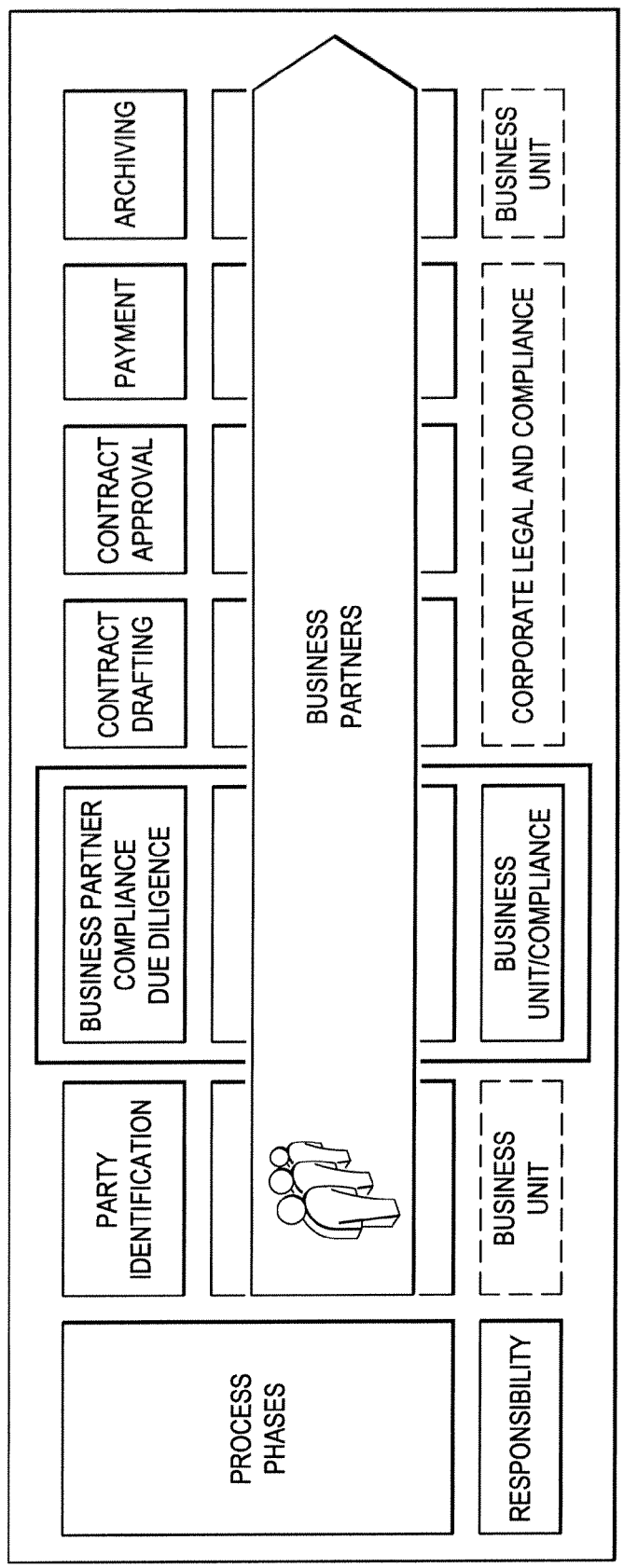
FIG. 1 illustrates an example business process for a contracting entity to identify, analyze, and work with a business partner, along with the responsible party for each phase of the process, in accordance with certain embodiments of the invention.

Selected embodiments of the disclosure may be understood by reference, in part, to FIGS. 1-36, wherein like numbers refer to same and like parts. The present disclosure is broadly concerned with systems and methods for performing a due diligence analysis for a potential business partner of a business entity. The business entity that analyzes a potential business partner is also referred to herein as the "contracting entity." As opposed to many traditional techniques, the due diligence analysis of the present invention includes a standardized front-end risk assessment to classify a potential business partner into a predefined risk class, which determines a set of standardized due diligence procedures to perform for the potential business partner.

A due diligence analysis according to the present invention may include multiple phases. For example, the due diligence analysis may include four main phases: a pre-work phase, including the collection of key data, a front-end risk assessment phase, a due diligence questionnaire phase, and an approval phase. In the pre-work phase, the due diligence process is initiated and key data regarding the potential business partner, as well as transactional key data (scope and conditions) under which the work will be performed, are collected. In the front end risk assessment phase, the key objective is to determine the respective risk level of the potential business partner. The risk level helps to determine the potential corruption and bribery risk of the potential business partner. In the due diligence questionnaire phase, additional information on the potential business partner and its business activities is collected to provide an adequate basis for an approval decision. In the approval phase, the potential business partner is approved or rejected on the basis of the information collected during the first three phases. In some embodiments, the first three phases may be performed by any employee of the contracting entity, while the approval phase may be performed only by authorized persons (e.g., a manager or compliance officer).

In some embodiments, a business partner compliance due diligence tool ("BPCDD tool") is provided to facilitate due diligence analyses of various potential business partners. The BPCDD tool may comprise a software application accessible to users associated with a contracting entity (e.g., employees of the contracting entity). The BPCDD tool may provide a user interface allowing a user to enter various data, an analysis engine to process the entered data for various aspects of the due diligence, and a reporting engine for reporting the results of such analyses.

In an example due diligence analysis of a potential business partner for a contracting entity, a user (any employee of the contracting entity) may login to the BPCDD tool. The BPCDD tool may then guide the user through various phases, including:

(i) A pre-work phase, including the identification of the potential business partner and initiation of the due diligence process, and entry of "key data." After logging in, the BPCDD tool provides the user in interface to search for potential business partner in the BPCDD tool's database and, if located, recall an existing due diligence or initiate a new due diligence for the potential business partner, or if not located, to add the potential business partner to the BPCDD tool's database and initiate a new due diligence for the newly added potential business partner. After initiation the due diligence process, the user is prompted to enter various "key data" regarding the potential business partner, the scope of the potential business partnership, etc.

(ii) A risk assessment phase in which the user answers a set of risk related questions presented by the BPCDD tool, and the BPCDD tool automatically calculates a risk classification (e.g., "lower," "medium," or "higher" risk) for the potential business partner based on the user's answers. The risk assessment phase may also include an integrity check regarding the potential business partner, in which the BPCDD tool prompts the user to perform Internet searches regarding the potential business partner (e.g., using search keywords such as the name of the potential business partner and "corrupt" or "fraud"). If the integrity check indicates doubts regarding the integrity of the potential business partner, the BPCDD tool may automatically assign a "higher risk" classification to the potential business partner, regardless of the user's answers to the risk related questions.

(iii) A due diligence questionnaire phase, in which the user answers a set of due diligence questions automatically selected by the BPCDD tool based at least on the determined risk class for the potential business partner. For example, the higher the determined risk class for the potential business partner, the more due diligence questions the BPCDD tool may require the user to answer.

(iv) An approval phase, which may include a release step, a review step, and finally an approval step. The number of persons required to complete these three processes of the approval phase may be determined by the BPCDD tool based at least on the risk class determined for the potential business partner. For example, if the risk class is determined as lower risk, the BPCDD tool may allow a single person (e.g., manager or compliance officer) to complete all three of the release, review, and approval steps; if the risk class is determined as "medium risk", the BPCDD tool may require a first person to complete the release step and a second person to complete the review step and the approval step; and if the risk class is determined as "higher risk", the BPCDD tool may require a first person to complete the release step, a second person to complete the review step, and a third person to complete the approval step.

The BPCDD tool may also allow the reuse of a due diligence analysis for a business partner if that business partner is later analyzed as a potential business partner for a subsequent project, in particular situations. For example, after facilitating a risk assessment stage and determining a risk class for the potential business partner in the context of the subsequent project, the BPCDD tool may compare the subsequent risk class with the originally determined risk class determined for the potential business partner. If the subsequent risk class indicates a lower or similar level of risk as the originally determined risk class, the BPCDD tool may allow at least a portion of the due diligence data received during the original analysis of the potential business partner to be reused for the subsequent analysis. This may allow the contracting entity to avoid unnecessarily duplicating the due diligence process for the business partner.

FIG. 1 illustrates an example business process for a contracting entity to identify, analyze, and work with a business partner, along with the responsible party for each phase of the process. As shown, party identification (i.e., identifying a potential business partner), business partner due diligence, contract drafting, contract approval, payment, and archiving. As shown along the bottom of FIG. 2, a business unit of the contracting entity may be responsible for the party identification phase; a business unit/compliance entity may be responsible for the business partner compliance due diligence phase; corporate legal and the compliance entity may be responsible for the contract drafting, contract approval, and payment phases of the process; and the business unit may be responsible for the archiving phase. The present invention, including the BPCDD tool, is focused on the business partner compliance due diligence phase of the business process, as indicated by the box shown in FIG. 1.

Figure 2A:
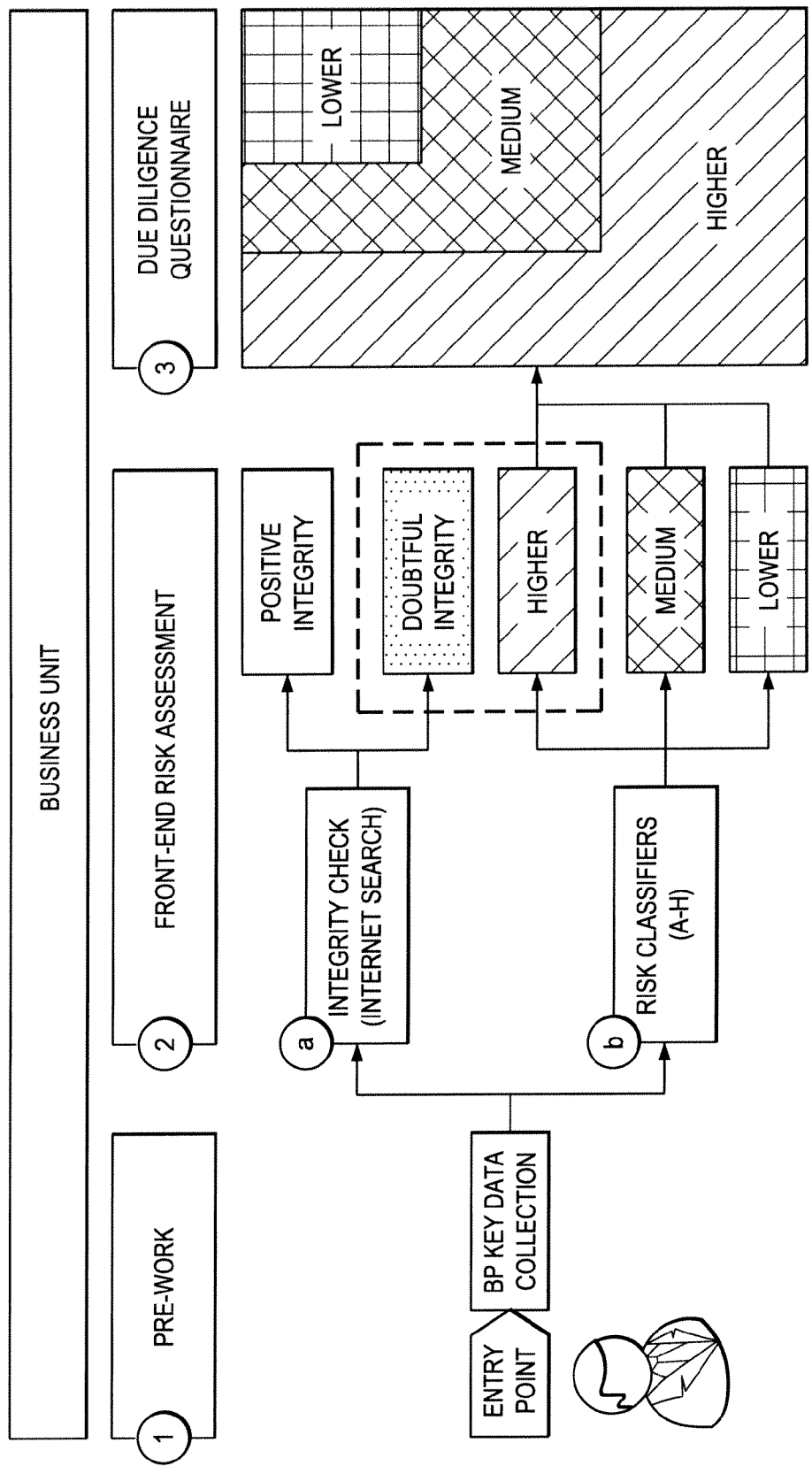
FIGS. 2A and 2B illustrate an example process flow of a four-phase business partner compliance due diligence process, according to certain embodiments of the invention.
Figure 2B:
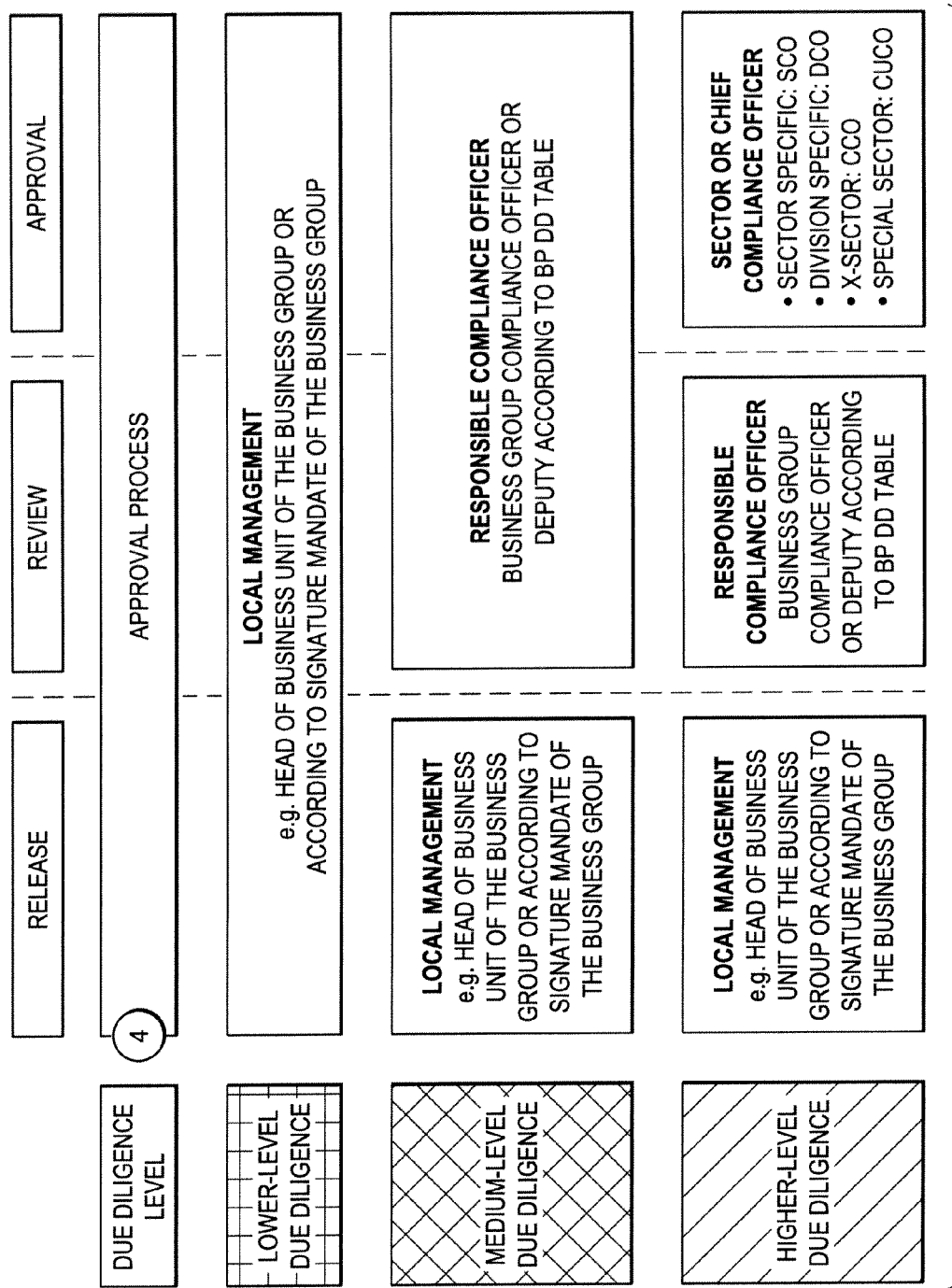

As discussed above, the business partner compliance due diligence may include four phases: a pre-work phase, a risk assessment phase, a due diligence questionnaire phase, and an approval phase. FIGS. 2A and 2B illustrate an example process flow for these four phases of the business partner compliance due diligence process, according to certain embodiments of the invention. As shown in FIG. 2A, the pre-work phase may include the entry point into the due diligence process, and the key data collection for the potential business partner. The entry point into the due diligence process may include a user logging into the BPCDD tool will and initiating the due diligence process for the potential business partner and key data collection may include user entry of various data regarding the potential business partner, the scope of the potential business partnership, etc. This user is referred to herein as the "originator." Key data may include, for example:

the business partner's name, type of business partner, address, one or more unique identifiers, contacts, etc.;
an identification of one or more hierarchical levels of the contracting entity that the business partner will work with, e.g., a sector, division, business unit, and business group of the contracting entity; and
the identity of one or more authorized users allowed to access the due diligence analysis (e.g., one or more co-originators or viewers assigned access or viewing rights to the due diligence analysis).

Example screenshots of the pre-work phase are discussed below with reference to FIGS. 6-16.

Returning to FIG. 2A, after the pre-work phase, a front-end risk assessment is performed, which may include (a) a determination of a risk classification for the potential business partner and (b) an integrity check. The risk classification determination may include the BPCDD tool presenting a set of risk related questions to the originator, with different responses to each question having different predefined point values. The BPCDD tool may then calculate a total point value for the originator's responses, and determine a predefined risk class based on the total point value. As shown in FIG. 2A, the predefined risk classes may include "higher risk," "medium risk," and "lower risk." A screenshot of example risk classification questions is discussed below with reference to FIG. 17.

The integrity check may include the BPCDD tool prompting the originator to perform Internet searches to identify potential risks associated with the potential business partner. For example, the BPCDD tool may prompt the originator to perform an Internet search using the potential business partner's name and "corrupt" or "bribe" as search terms. The BPCDD tool may prompt the originator to indicate whether any adverse findings were uncovered from the Internet searches, and to provide documentation of such findings. An example integrity check screenshot is discussed below with reference to FIG. 18.

Referring to FIG. 2A, if no adverse findings were uncovered, the integrity check results in a positive integrity, which does not affect the risk classification or subsequent selection of due diligence questions to present to the originator. However, if any adverse findings were uncovered, the integrity check results in a doubtful integrity, and the BPCDD tool automatically assigns a "higher risk" classification to the potential business partner, regardless of the classification resulting from the risk question analysis, as indicated in FIG. 2A.

After completion of the risk assessment, the process moves to the due diligence questionnaire. First, the BPCDD tool selects a set of due diligence questions to present to the originator, based at least on the determined risk class for the potential business partner. In general, the higher the risk class, the more thorough the due diligence questionnaire. For example, in the embodiment shown in FIG. 2A, a full questionnaire is presented to the originator in the case of a "higher risk" potential business partner, a subset of the "higher risk" questionnaire is presented to the originator in the case of a "medium risk" potential business partner, and a subset of the "medium risk" questionnaire is presented to the originator in the case of a "lower risk" potential business partner.

The due diligence questionnaire may include any suitable number and type of mandatory questions and/or optional questions, and may be divided into subject areas. For instance, the example due diligence questionnaire discussed below with reference to FIGS. 20-23 is divided into five subject areas: (a) business information, (b) business activities, (c) litigation, (d) references, and (e) signed certification. The signed certification may prompt the originator to certify the integrity of the due diligence responses. The due diligence questionnaire may also prompt the originator to identify one or more authorized releasers (e.g., by e-mail address, name, or other identifier), defined as persons authorized to release the risk assessment and due diligence results for review and approval, as discussed below regarding the approval phase.

In some embodiments, the pre-work phase, risk assessment phase, and the due diligence questionnaire phase may be completed by any employee of the relevant business unit of the contracting entity. In contrast, as discussed below, the approval process typically requires input from one or more authorized persons, e.g., managers or compliance officers.

FIG. 2B illustrates an example approval phase of the due diligence process, according to certain embodiments of the invention. In this example, the approval phase includes a release step, a review step, and an approval step. The release step involves releasing the results of the risk assessment and due diligence questionnaire for review and approval. Screenshots of an example release step are discussed below with reference to FIGS. 24-26. The review step involves a review of certain due diligence responses of the originator, including at a minimum a review of the originator's responses to any mandatory due diligence questions. Screenshots of an example release step are discussed below with reference to FIGS. 27-28. The approval step involves a final approval of the risk assessment and due diligence responses. Screenshots of an example release step are discussed below with reference to FIGS. 29-30.

As indicated in FIG. 2B, the person responsible for each of the release, review, and approval steps depends upon the due diligence level (lower-level, medium-level, or higher-level), which corresponds to the risk classification determined for the potential business partner. Regardless of the due diligence level, the person who performs the release function, i.e., the "releaser," may be identified by the originator during the due diligence questionnaire phase, e.g., as discussed below with reference to FIG. 23. In the embodiment shown in FIG. 2B, the originator may assign as the releaser anyone having signature authority for the relevant business group (i.e., the business group identified in the key data), such as a local manager.

In the embodiment shown in FIG. 2B, where a lower-level due diligence was performed, the releaser (e.g., local manager) may release, review, and approve the risk assessment/due diligence results.

Where a medium-level due diligence was performed, the releaser (e.g., local manager) is allowed to release the risk assessment/due diligence results, not to review or approve the results. Rather, a responsible compliance officer (RCO) is required to review and approve the results. The RCO may be, for example, a compliance officer (CO) or deputy CO of the relevant business group. The RCO may be selected by the releaser, with the selection being facilitated by the BPCDD tool. For example, as discussed below with reference to FIG. 25, the BPCDD tool may automatically identify one or more possible reviewers (RCOs) based on particular key data entered by the originator (e.g., the business group that the potential business partner will work with), and the releaser may then select one of these identified reviewers (RCOs) for reviewing and approving the results.

Where a higher level due diligence was performed, the releaser (e.g., local manager) is allowed to release the risk assessment/due diligence results but not to review or approve the results, the reviewer (e.g., RCO identified by tool 18 and selected by the releaser as discussed above) is allowed to review the results but not to approve the results; rather, a third individual is required to approve the results. This approver may be, e.g., a sector compliance officer (SCO), a division compliance officer (DCO), a corporate units compliance officer (CUCO), a chief compliance officer (CCO), or an approved deputy of any of the preceding. The approver may be selected by the reviewer (e.g., RCO), with the selection being facilitated by the BPCDD tool. As discussed below with reference to FIG. 28, the BPCDD tool may automatically identify one or more potential approvers (COs) based on particular key data entered by the originator (e.g., the sector, division, and/or business group that the potential business partner will work with), and the reviewer may then select one of these identified approvers (COs) for approving the results.

In an example embodiment, as part of the key data entry, the originator may enter data indicating the sector, the division within the sector, and/or the business group of the contracting entity that the potential business partner will work with (e.g., see the "sector", "division", and "business group" fields in key data entry screen 200 shown in FIG. 14). The BPCDD tool may automatically identify one or more potential approvers (COs) based on this sector, division, and/or business group data. For example:

(a) If the business partner will be working for a specific sector but not a specific division within that sector, the originator may indicate such in key data entry screen 200 (FIG. 14). For example, the originator may select the specific sector in the sector field, and select an "all divisions" or "performed on the sector level" option provided in the division field. In response, the BPCDD tool will access a database to identify the individual(s) having approval authority at the sector level—e.g., the sector compliance officer (SCO) and/or deputy SCO(s) for the selected sector. The reviewer may then select an approver from these identified individual(s).

(b) If the business partner will be working for a specific sector and a specific division within that sector, the originator may select the sector and the division in key data entry screen 200 (FIG. 14). In response, the BPCDD tool will access a database to identify the individual(s) having approval authority at the division level—e.g., the division compliance officer (DCO) and/or deputy DCO(s) for the selected division. The reviewer may then select an approver from these identified individual(s).

(c) If the business partner will not be working for a specific sector (e.g., where the business partner is law firm), the originator may indicate such in key data entry screen 200 (FIG. 14). For example, the originator may select an "all sectors" or "performed on the business group level" option provided in the sector field. In response, the BPCDD tool will access a database to identify the individual(s) having approval authority at the business group level—e.g., the chief compliance officer (CCO) and/or deputy CCO(s) for the business group entered by the originator. The reviewer may then select an approver from these identified individual(s).

(d) If the business partner will be working for one of a predefined group of "special" sectors (e.g., real estate, financial service, or information systems), the originator may select the sector and (if appropriate) the division in key data entry screen 200 (FIG. 14). In response to selecting a "special" sector, the BPCDD tool will access a database to identify the individual(s) having approval authority for the "special" sectors—e.g., the corporate unit's compliance officer (CUCO) and/or deputy CUCO(s) for the business group entered by the originator. The reviewer may then select an approver from these identified individual(s).

FIG. 3 illustrates the various roles and responsibilities for individuals performing the release, review, and approval steps, based on the relevant due diligence level (lower-level, medium-level, or higher-level), according to the embodiment shown in FIG. 2B. For a potential business partner that required only a lower-level due diligence, a single individual may act as the releaser, reviewer, and approver. Acting as the releaser, the individual views and releases or rejects the risk assessment and due diligence questionnaire. Then, acting as the reviewer, the individual performs a qualitative review of the risk assessment and due diligence questionnaire. Finally, acting as the approver, the individual approves or rejects the business partner.

For a potential business partner that required a medium-level due diligence, a first individual acts as the releaser, and a second individual acts as the reviewer and the approver. Specifically, the first individual views and releases (to the second individual) or rejects the risk assessment and due diligence questionnaire, and the second individual reviews the risk assessment and due diligence questionnaire, and then approves or rejects the business partner.

Finally, for a potential business partner that required a higher level due diligence, a first individual acts as the releaser, a second individual acts as the reviewer, and a third individual acts as the approver. Specifically, the first individual views and releases (to the second individual) or rejects the risk assessment and due diligence questionnaire. The second individual reviews the risk assessment and due diligence questionnaire, and submits a request for approval to the third individual. The third individual re-evaluates the review results of the second individual, and approves or rejects the business partner.

Figure 4:
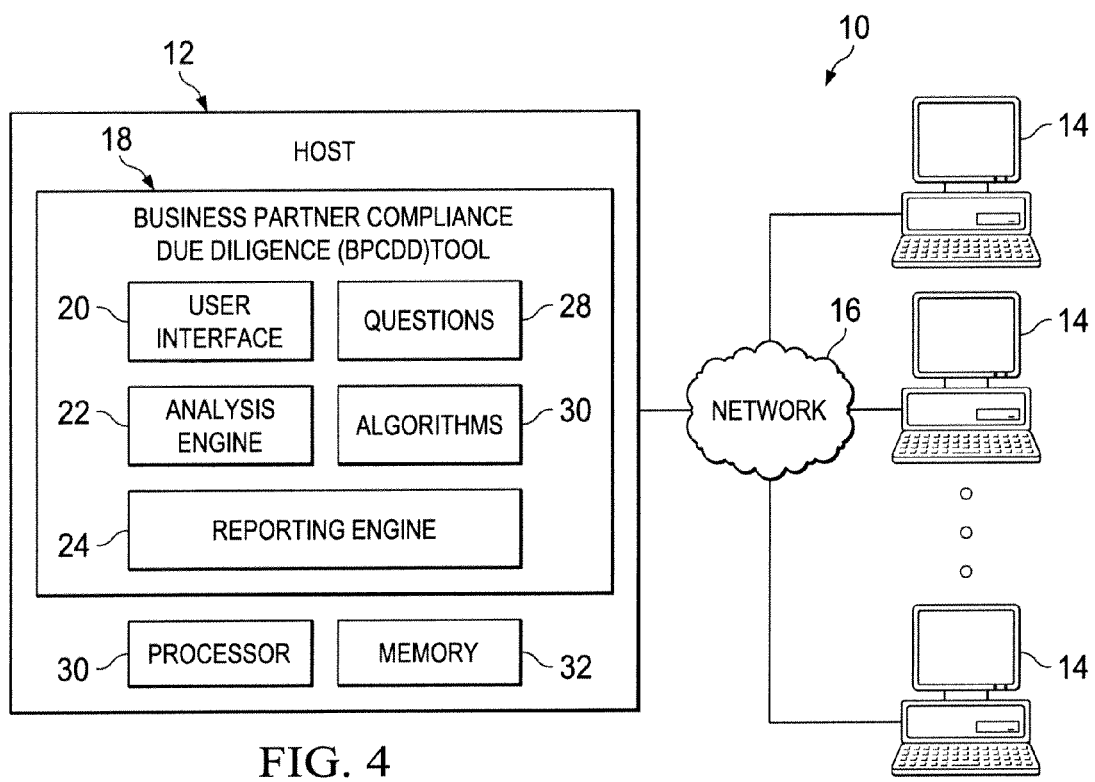
FIG. 4 illustrates an example system for facilitating due diligence analyses for potential business partners of a contracting entity, according to certain embodiments of the invention.

FIG. 4 illustrates a system 10 for facilitating due diligence analyses for potential business partners of a contracting entity, in accordance with certain embodiments of the invention. System 10 includes a host 12 communicatively connected to a number of user terminals 14 by a network 16. Host 12 may comprise any type of computer system operable to host a BPCDD tool 18. In certain embodiments, host 12 may be a server. In another embodiment, host 12 may be a personal computer. In some embodiments, BPCDD tool 18 may be hosted by a particular user terminal 14, or an instance of BPCDD tool 18 may be hosted by each user terminal 14.

As depicted in FIG. 4, host 12 may include a processor 30, memory 32 communicatively coupled to processor 30, and any other suitable components for executing BPCDD tool 18.

Processor 30 may comprise any system, device, or apparatus operable to interpret and/or execute program instructions and/or process data associated with BPCDD tool 18, and may include, without limitation, a microprocessor, microcontroller, digital signal processor (DSP), application specific integrated circuit (ASIC), or any other digital or analog circuitry configured to interpret and/or execute program instructions and/or process data associated with BPCDD tool 18. In some embodiments, processor 30 may interpret and/or execute program instructions and/or process data stored in memory 32 and/or another component of host 12.

Memory 32 may be communicatively coupled to processor 30 and may include any computer-readable media suitable for storing any data or logic associated with BPCDD tool 18. For example, memory 32 may include computer-readable media for storing data and logic instructions associated with user interface 20, analysis engine 22, reporting ending 24, questions 28, and algorithms 30 of BPCDD tool 18. For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; and/or any combination of the foregoing.

Each user terminal 14 may include any type of computer suitable for interacting with BPCDD tool 18, e.g., a personal computer, a laptop, a PDA, etc. Each terminal 14 may include any suitable hardware for interacting with BPCDD tool 18, e.g., processors, memory, software, and input and output (I/O) devices (e.g., a keyboard, a mouse, and a video display).

In some embodiments, BPCDD tool 18 is hosted locally by one or more user terminals 14, allowing directly access to BPCDD tool 18. In other embodiments, BPCDD tool 18 is hosted by host 12 and accessible at each user terminal 14 via network 16. Thus, each terminal 14 may include a browser application for accessing BPCDD tool 18 via network 16 (e.g., an intranet or the Internet).

Network 16 may be a network and/or fabric configured to couple host 12 to target device 120. Network 16 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data) between host 12 and user terminals 14. Network 16 may transmit data using wireless transmissions and/or wire-line transmissions via any storage and/or communication protocol. Network 16 and its various components may be implemented using hardware, software, or any combination thereof. In some embodiments, network 16 allows user terminals 14 to access BPCDD tool 18 via an intranet, such as a company-wide intranet. In other embodiments, network 16 allows user terminals 14 to access BPCDD tool 18 via the Internet.

BPCDD tool 18 is generally operable to facilitate the potential business partner compliance due diligence analyses discussed herein. BPCDD tool 18 includes a user interface 20, an analysis engine 22, a reporting engine 26, questions 28, and algorithms 30.

User interface 20 is generally configured to allow a user to interact with BPCDD tool 18. User interface 20 may comprise any instrumentality or aggregation of instrumentalities by which a user may interact with BPCDD tool 18. For example, user interface 20 may include a series of web pages or screens providing data to a user at user terminal 14, prompting the user for data, and providing interfaces (e.g., text fields, menus, check boxes, etc.) allowing the user to enter data with an input device (e.g., a keyboard or pointing device).

Analysis engine 22 is generally configured to analyze and process data entered by user(s) at user terminal(s) 14, e.g., to select particular questions or other prompts to present the user, analyze the user's responses, determine a risk class for the user, determine the scope (e.g., number of required approvers) of the approval process, manage the reuse of due diligence data for a subsequent analysis of the same business partner, etc. BPCDD tool 18 may maintain sets of questions 28 and one or more algorithms 30. Analysis engine 22 may select particular questions 28 to present to the user via user interface 20, e.g., based on previous data entered by the user. For example, as discussed below, analysis engine 22 may select a set of due diligence questions to present to the user based on the risk class determined for the potential business partner (e.g., based on the user's responses to risk related questions and/or results of an integrity check performed by the user).

Analysis engine 22 may access algorithms 30 for performing various analyses. For example, algorithms 30 may define rules for determining a risk class for a potential business partner based on the user's responses to risk related questions and/or results of an integrity check performed by the user.

Reporting engine 26 is generally configured to report (e.g., by display or printout at user terminal 14) the results of analysis engine 22. For example, reporting engine 26 may generate a report summarizing the risk assessment and due diligence results for the potential business partner.

FIGS. 5-36 illustrate example screenshots generated by BPCDD tool 18 of FIG. 4 for an example due diligence process of a potential business partner by a contracting entity, according to one embodiment of the invention.

Figure 5:
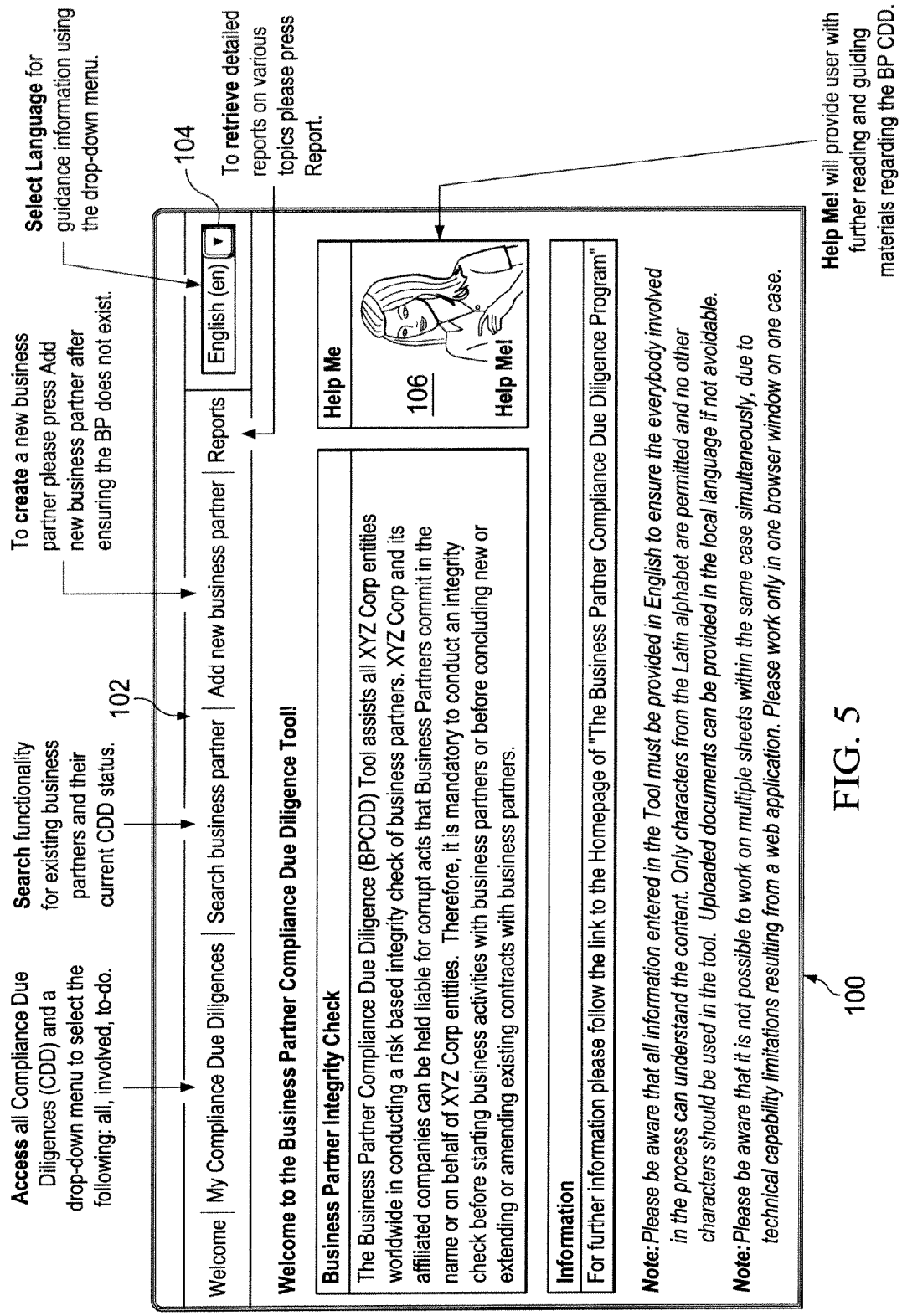
FIG. 5 illustrates an example welcome screen generated by a computer-implemented business partner compliance due diligence (BPCDD) tool, according to certain embodiments of the invention.

FIG. 5 illustrates an example welcome screen 100. Welcome screen 100 includes a menu bar 102, a language selection tool 104, a "help me" tool 106, and various welcome text directed to a due diligence process originator. Menu you bar 102 includes the following selectable options: "my compliance due diligences," "search business partner," "add new business partner," and "reports."

The "my compliance due diligences" option allows the user to access compliance due diligences (CDDs) managed by BPCDD tool 18. Clicking on this option takes the user to the "my compliance due diligences" screen 120 shown in FIG. 6. The "search business partner" option allows the user to search for existing business partners and their current due diligence status. Clicking on this option takes the user to the "surge business partner" screens shown in FIGS. 7-9. The "add new business partner" option allows the user to create a new business partner (e.g., after the user determines that the business partner does not already exist in BPCDD tool 18). Clicking on this option takes the user to the "add new business partner" screens shown in FIGS. 10-11. Finally, the "reports" option allows the user to retrieve detailed reports on various topics.

Language selection tool 104 may include a drop-down menu allowing the user to select a particular language for BPCDD tool 18. "Help me" tool 106 may provide the user with further reading and guiding materials regarding the business partner compliance due diligence process.

FIGS. 6A-6B illustrate an example "my compliance due diligences" screen 120. Screen 120 includes a searching tool 122 and search results area 124. Searching tool 122 provides a number of search fields 126 allowing the user to search for existing due diligences (CDDs) by particular search criteria, such as CDD ID, CDD reference, CDD short name, CDD originator, sector/division/BU, risk level, CDD status, CDD last modified, business partner name, business partner country, and/or business partner ID. Thus, a user may enter data into one or more search fields 126 and click the search button 130 to initiate a search of existing due diligences, with the results being displayed in search results area 124.

Searching tool 122 also includes a filtering tool 132 allowing the user to select between a view of "all," "to-do," and "involved" due diligences. Selecting "all" displays all due diligence search results in the search results area 124. Selecting "to-do" displays only the due diligences for which an action is required of the user (e.g., due diligences for which the user is a listed approver). Selecting "involved" displays only the due diligences for which the user is the originator or a listed co-originator.

Searching tool 122 also includes an "export CDD list" allowing the user to download his search results, e.g., to a Microsoft Excel spreadsheet.

FIGS. 7-9 illustrate example screenshots for searching for an existing business partner in BPCDD tool 18, which may be displayed upon selection of the "search business partner" option in menu 102. FIG. 7 shows a first business partner search screen 140. Screen 140 includes a searching tool 142 and search results area 144. Searching tool 142 provides a number of search fields 146 allowing the user to search for existing business partners by particular search criteria, such as business partner ID, type of business partner, business partner name, and/or business partner country. Thus, a user may enter data into one or more search fields 146 and click the search button 148 two initiate a search of existing business partners, with the results being displayed in search results area 144.

FIG. 8 shows a second business partner search screen 150 illustrating example search results, namely a list of business partners resulting from a search. For each listed business partner, BPCDD tool 18 displays the business partner ID, the type of business partner, the business partner name, a business partner country, the maximum risk level for all due diligences existing for that business partner, and the number of due diligences maintained by BPCDD tool 18 for that business partner. Clicking on a magnifying glass icon 152 for a particular business partner displays all due diligences for that business partner, as shown in FIG. 9 (discussed below). To initiate a new due diligence for an existing business partner, the user may click a pencil icon 154 corresponding to that business partner. However, before initiating a new due diligence for an existing business partner, the user should first determine with the appropriate compliance officer whether an existing due diligence for that business partner can be reused.

FIG. 9 shows a third business partner search screen 160 illustrating example results from clicking on the magnifying glass icon 152 for a particular business partner. In particular, the results include a listing of relevant key data for every due diligence maintained by BPCDD tool 18 for that business partner, in this case five due diligences. In this example, the relevant key data for each due diligence (CDD) includes CDD ID, CDD reference, CDD short name, CDD originator, sector, division, business group, risk level, CDD status, CDD last modified, business partner name, business partner country, and/or business partner ID.

If the user is assigned to a particular due diligence (either as an originator or a viewer), the user may click on another magnifying glass icon 162 to retrieve detailed information about that due diligence. Based on the user's rights, he can either contribute to the due diligence or view the current status of the due diligence.

FIGS. 10-11 illustrate example screenshots for adding a new business partner into BPCDD tool 18, which may be displayed upon selection of the "add new business partner" option in menu 102. FIG. 10 shows a first screen 170 for adding a new business partner. Screen 170 includes various fields for entering key data regarding the new business partner, such as the business partner type, business partner name, business partner address and website, and any known key contacts at the business partner. Mandatory fields may be marked with an asterisk. When the originator enters the business partner name, BPCDD tool 18 may automatically perform a phonetic search for similar names, to help prevent multiple different names being entered into BPCDD tool 18 for the same business partner. For the "business partner type," the originator may choose whether the business partner is a legal entity or a natural person.

After the originator enters the relevant key data, the originator may click on the save button 172 to save the data in BPCDD tool 18. Upon saving the data, BPCDD tool 18 may automatically assign a unique business partner ID 174, a unique accounting identifier 176, and the originator 178 of the new business partner.

FIG. 11 shows screen 170 after the originator has filled in key data for the business partner, and clicked save button 172. As shown, BPCDD tool 18 automatically generates the unique business partner ID 174 (720) and identifies the originator (Mike Jones). After save button 172 has been clicked, certain key data fields may be changed at any time until the due diligence has been submitted for release. Certain locked data may be displayed in gray. A change log 180 may log every action and change to the business partner key data. After clicking the save button 172, a "find CDDs" button 184 and a "new compliance due diligence" button 186 may appear on screen 170. The "find CDDs" button 184 allows the originator to access a complete list of all conducted due diligences for this business partner. Clicking the "new compliance due diligence" button 186 initiates a new due diligence for the business partner.

Upon clicking the "new compliance due diligence" button 186, the key data entry phase of the due diligence process is initiated. FIG. 12 illustrates a key data entry screen 200 for entering key data regarding the due diligence. Screen 200 includes a due diligence navigation bar 202 and a key data entry area 204. Due diligence navigation bar 202 indicates the current phase of the due diligence process: key data entry, risk assessment, due diligence questionnaire, release, review, or approval. One or more items on the navigation bar 202 may disappear or merge together based on results of the risk assessment phase. For example, if the risk assessment phase determines a lower-risk class for the business partner, the release, review, and approval phases may be performed by a single individual. Thus, the release, review, and approval tabs in navigation bar 202 may automatically merge into a single tab upon the lower-risk class determination.

Key data entry area 204 includes a number of fields for entering various key data, such as a reference number or ID, organizational data, a short name, and a description. The reference number or ID may be entered for the originator's own purposes. For example the originator may enter an internal reference number of the contracting entity, a customer reference number, or a project ID (from a project analysis tool). The description may include a brief description of the activities or operations to be performed by the business partner. The organizational data may include data regarding the organizational unit of the contracting entity, by hierarchical level, that the proposed business partner will work with, such as the business group, sector, division within the sector, and/or business unit within the division of the contracting entity. The originator may leave one or more of these hierarchical levels blank, such as where a proposed business partner will not be working for a particular division within a selected sector, or where a proposed business partner will not be working for a particular sector (e.g., a law firm business partner). BPCDD tool 18 may use the organizational data entered by the originator for automatically identifying (e.g., by accessing appropriate databases) individuals to propose as possible releasers, reviewers, and/or approvers during the approval phase of the due diligence process, e.g., as discussed below with reference to FIGS. 21-26.

When the originator fields in the data and clicks a save button 208, a CDD ID 210 is automatically assigned to the due diligence by BPCDD tool 18 (as shown in FIG. 15), and a screen 220 (an updated version of screen 200) shown in FIGS. 13-14 is displayed by BPCDD tool 18.

As shown in FIGS. 13-14, screen 220 includes a key data overview 222, filled in key data entry area 204, a screening authorization area 224, a cancel button 226, an authorized users selection area 228, and a save button 230. Key data overview 222 be displayed throughout the due diligence process.

Screening authorization area 224 provides an interface to upload a screening authorization document (e.g., a scan documents), which is a document signed by the business partner that authorizes the contracting entity to conduct a pre-employment and/or background investigation to prove the suitability and trustworthiness of the business partner to the contracting entity.

Cancel button 226 (FIG. 14) allows the originator to cancel the due diligence process as long as the due diligence has not been submitted for release. Authorized users selection area 228 (FIG. 14) allows the originator to select one or more additional authorized users. In this example embodiment, the originator of the due diligence is set by default and cannot be changed. To provide other colleagues editing rights to the due diligence (e.g., for support purposes), the originator may select "co-originator" from the drop-down menu and enter an e-mail address. To provide other colleagues read-only access to the due diligence, the originator may select "view or" from the drop-down menu and enter an e-mail address.

After completing the key data entry, the originator may click on save button 232 saves the data and proceed to the risk assessment phase.

Figure 16:
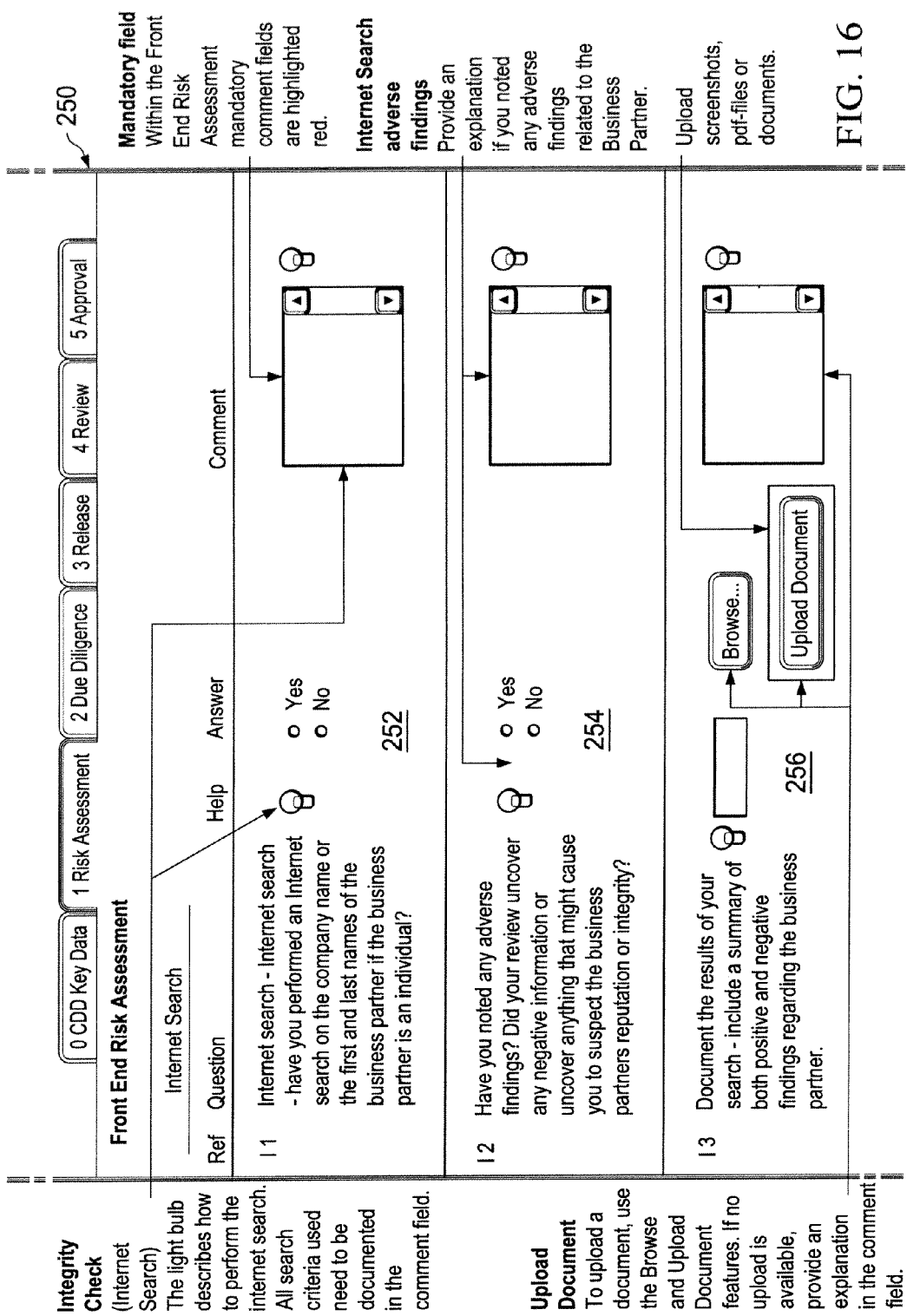
FIG. 16 illustrates an example integrity check screen generated by the BPCDD tool, according to certain embodiments of the invention.

The risk assessment phase may include a risk assessment questionnaire (FIG. 15) and an integrity check (FIG. 16). FIG. 15 illustrates an example risk assessment questionnaire 240, which may include risk classifier questions selected from the question bank 28 (see FIG. 4). For example, the risk assessment questionnaire 240 may include eight standard questions. Some questions may allow the originator to select multiple answers. In addition, questionnaire 240 prompts the originator to enter comments for particular questions. Selectable icons may be provided for guidance an explanation of particular questions. For example, the originator may click a light bulb icon 242 to receive further guidance regarding the question, or exclamation mark icon 244 to receive an explanation regarding the implications on the risk.

Figure 17:
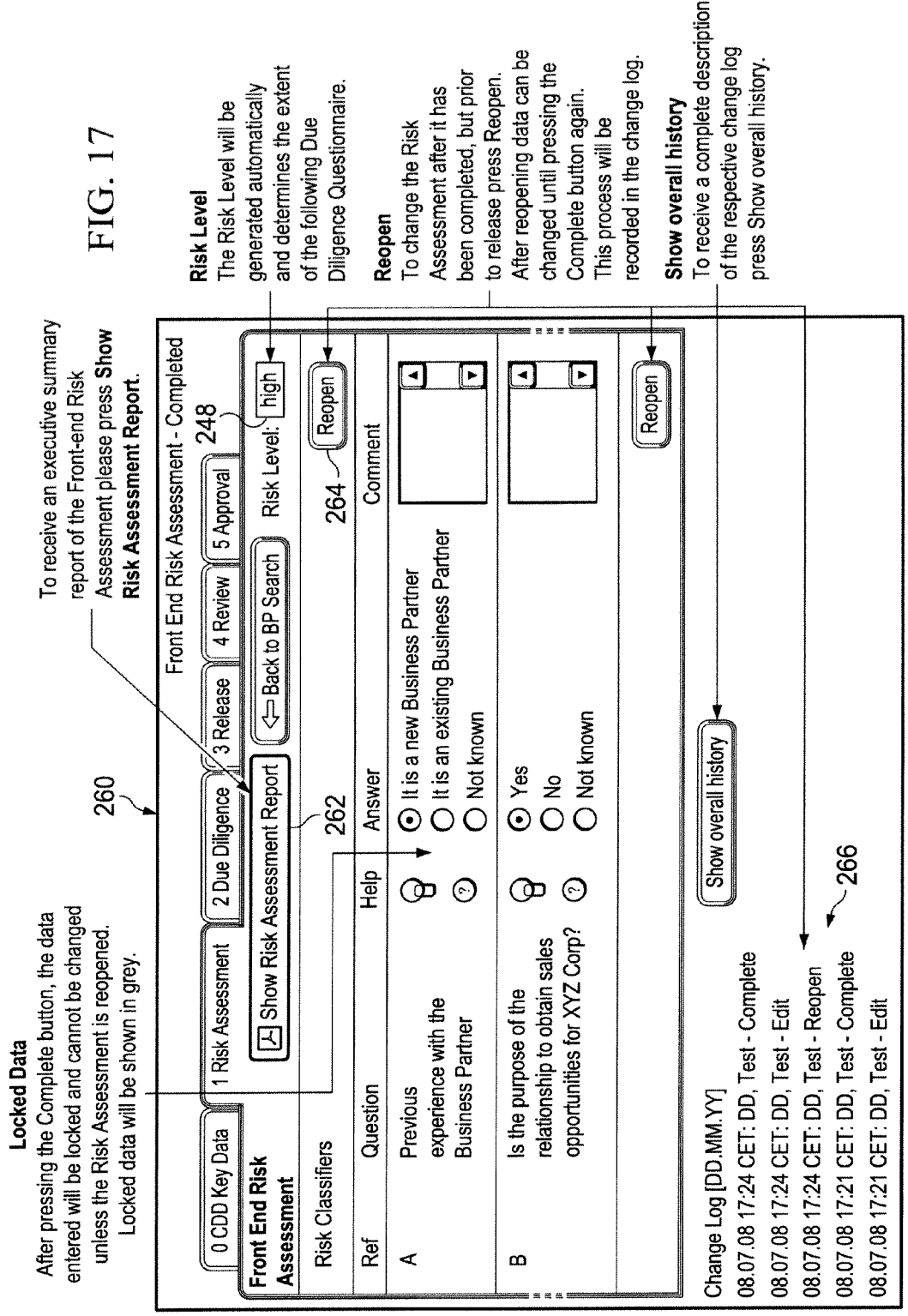
FIG. 17 illustrates a risk assessment completion screen generated by the BPCDD tool, according to certain embodiments of the invention.

The different responses to each risk classifier question may be assigned different point values. The point values may correspond with the risk indicated by particular answers. For example, for "Question D: Has the business partner been recommended by governmental officials," a "Yes" response may be assigned 10 points, while a "No" response may be assigned 25 points. When the originator completes the risk assessment questionnaire and clicks the complete button 246, BPCDD tool 18 calculates a total point value for the originator's answers and determines a risk level corresponding to that total point value. For example, a "lower-level" risk class may correspond to a total point value range of 0-100, a "medium-level" risk class may correspond to a total point value range of 101-500, and a "higher-level" risk class may correspond to a total point value range of 501-100. BPCDD tool 18 may then display an indication of the risk level 248, e.g., as shown in FIG. 17.

FIG. 16 illustrates an example screen 254 facilitating an integrity check of the potential business partner. Integrity check screen 250 may include three sections: an "Internet search" section 252, an "adverse findings" section 254, and a "documentation" section 256. The "Internet search" section 252 prompts the originator to perform an Internet search on the potential business partner to determine potential areas of risk concerning the potential business partner. BPCDD tool 18 across the originator to use search terms such as the company name of the potential business partner, the names of individuals associated with the potential business partner, and risk related terms such as "corrupt," "bribe," and "indict." For example, if the potential business partner's name was "XYZ Company" run by CEO George Marks the Internet search section may prompt the originator to run Internet searches for "XYZ Company+corrupt", "XYZ Company+bribe", "George Marks+indict", etc. BPCDD tool 18 may prompt the originator to enter all of such search criteria in the comments section.

The "adverse findings" section 254 may ask the originator whether any adverse findings were discovered during the Internet search, and to provide an explanation of any adverse findings in the comments section. As previously discussed with reference to FIG. 2A, a response of "Yes" to the adverse findings question automatically elevates the risk classification of the potential business partner to "higher-level" risk, regardless of the risk class determined based on the risk questionnaire.

The "documentation" section 256 prompts the user to document the results of the Internet search, and to provide a summary of positive and negative findings regarding the potential business partner. BPCDD tool 18 may provide "browse" and "upload document" buttons for locating and uploading the documentation, which may include screenshots, .pdf files, and/or other documents.

FIG. 17 illustrates a risk assessment completion screen 260, displayed after the originator completes the risk assessment questionnaire and integrity check. Screen 260 displays the originator's responses to the risk assessment questions, along with risk level indicator 248, a "show risk assessment report" button 262, "reopen" buttons 264, and a change log 266. After the originator presses complete button 246 at the completion of the risk questionnaire (FIG. 15), the entered data is locked and cannot be changed unless the risk assessment is reopened, by clicking reopen button 264. After clicking reopen button 264, data entered in screens 240 and/or 250 can be changed until pressing complete button 246 again. Any changes made after reopening the risk assessment are saved in change log 266. A user may click "show risk assessment report" button 262 to receive an executive summary report of the risk assessment.

The remaining screenshots corresponding to a determination a "higher-level" risk class for the potential business partner. Thus, the due diligence questionnaire phase and the approval phase (which both depend in part on the risk class determination) shown in the remaining screenshots correspond to a "higher-level" risk class.

The process may then proceed to the due diligence questionnaire phase. FIGS. 18-21 illustrate screenshots of an example due diligence questionnaire 270. The particular questions included in due diligence questionnaire 270 are automatically selected by BPCDD tool 18 based on the risk class determined for the potential business partner during the risk assessment phase, as previously discussed with reference to FIG. 2A. In general, the higher the risk class determined during the risk assessment phase, the more thorough the due diligence questionnaire. For example, a full questionnaire may be presented in the case of a "higher risk" potential business partner, a subset of the "higher risk" questionnaire may be presented in the case of a "medium risk" potential business partner, and a subset of the "medium risk" questionnaire may be presented in the case of a "lower risk" potential business partner.

As shown in FIG. 18, due diligence questionnaire 270 may include a selectable question filter 272, a subject area index 274, a question area 276, and a "show due diligence report" button 278. Selectable question filter 272 may allow the user to some other subset of the questions. Subject area index 274 may include an index of the due diligence questions. For example the due diligence questionnaire may be divided into five subject areas: business information, business activities, litigation, references, and signed certification. The user may click on any subject area within index 274 to display the questions that fall under that subject area. In the example screenshots shown in FIGS. 18-20, the subject area "A.I Business Information: General business information" is selected, such that the questions falling under that subject area are displayed in question area 276.

Figure 19:

For each question, BPCDD tool 18 may provide any number and type of data entry fields for responding to that question. For example, as shown in FIG. 19, question A4 prompts the originator to list countries in which the business partner is expected to perform services. BPCDD tool 18 provides a selectable list of countries 280, allowing the originator to add (or remove) one country or multiple countries.

As another example, as shown in FIG. 20, question A1 prompts the originator to provide due diligence data for previous or alternative names of the potential business partner. As shown, BPCDD tool 18 may prompt the originator to enter a previous name, indicate whether a sanctioned party list has been checked for the previous name (along with the result of that check and an explanation of any adverse findings), and indicate whether an Internet search has been performed for the previous name (along with the result of that check and an explanation of any adverse findings). The sanctioned party list is a list of business partners that the contracting entity is prohibited from doing business with. The sanctioned party list may or may not be maintained by BPCDD tool 18. The originator may add additional entries (i.e., additional previous names for the business partner) or delete entries using the appropriate buttons 284.

Figure 21:
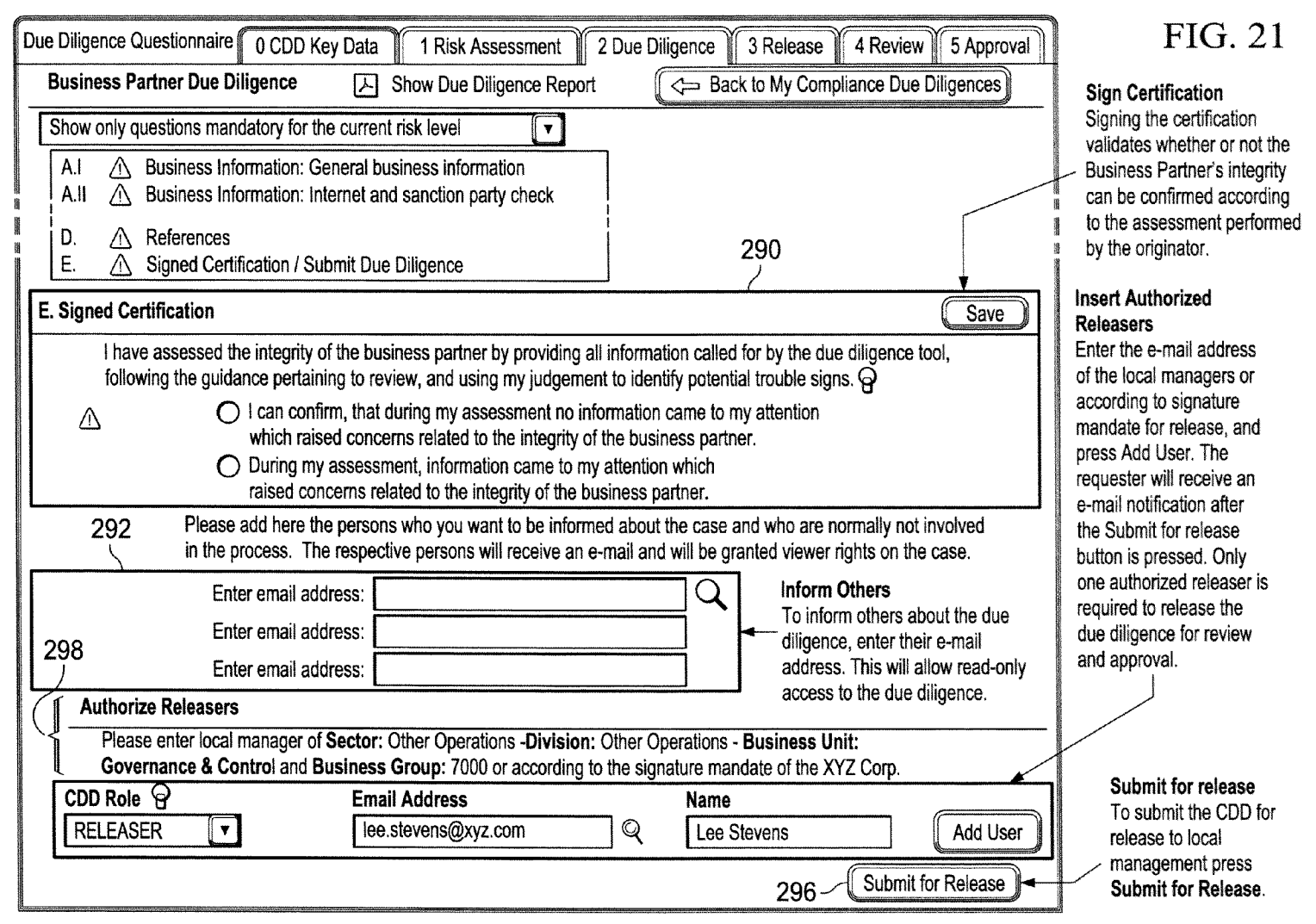

As shown in FIG. 21, due diligence questionnaire 270 may include a "signed certification" area 290, an "inform others" area 292, an "authorized releasers" area 294, and a "submit for release" button 296. "Signed certification" area 290 prompts the originator to validate whether or not the potential business partner's integrity can be confirmed. "Inform others" area 292 allows the originator to identify (e.g., by e-mail address) one or more colleagues to notify (e.g., by an automated e-mail notification) about the due diligence, which provides such colleagues read-only access to the due diligence. "Authorized releasers" area 294 allows the originator to identify one or more authorized releasers (persons authorized to release the due diligence for approval), e.g., by entering the appropriate e-mail address(es). An authorized releaser may be anyone having signature authority for the relevant business group (i.e., the business group identified during the key data entry phase), such as a local manager.

BPCDD tool 18 may provide a guidance tool 298 for identifying appropriate authorized releasers. For example, guidance tool 298 may automatically recall the business group, sector, division, and/or business unit entered by the originator during the key data entry phase (see FIG. 12), and prompt the originator to enter the local manager or other person having signatory authority for that business group, sector, division, and business unit, as shown in FIG. 21.

Once the originator has completed the sections, the originator may click "submit for release" button 296, which sends the due diligence to each identified releaser, e.g., by e-mail notification including a link to a release step provided by BPCDD tool 18. Although the due diligence may be sent to multiple releasers, only one releaser is required to release the due diligence for review and approval.

Figure 23:
Figure 25:
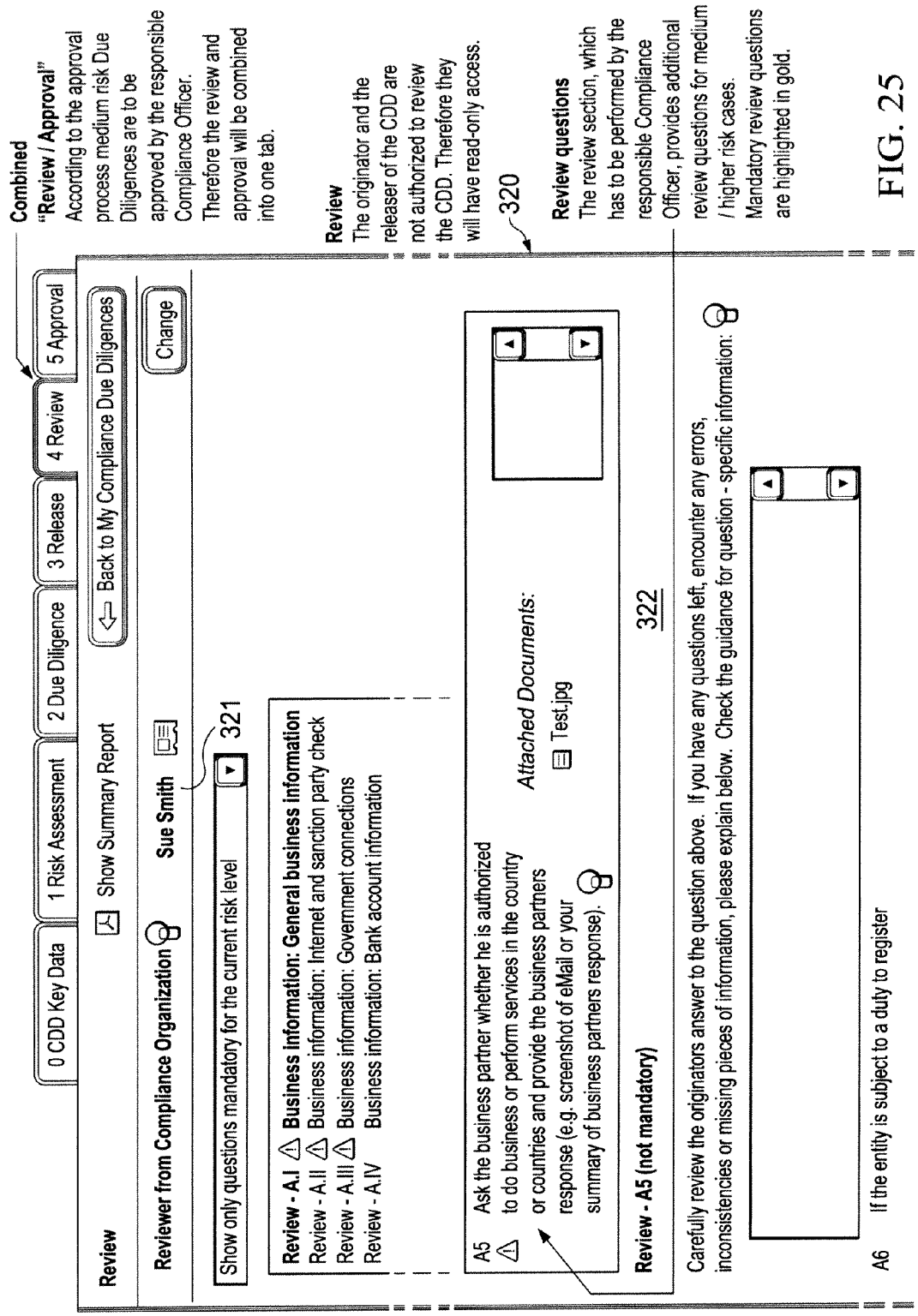
FIGS. 25-26 illustrate an example screen for facilitating the review step of the approval phase of the due diligence process, according to certain embodiments of the invention.
Figure 26:
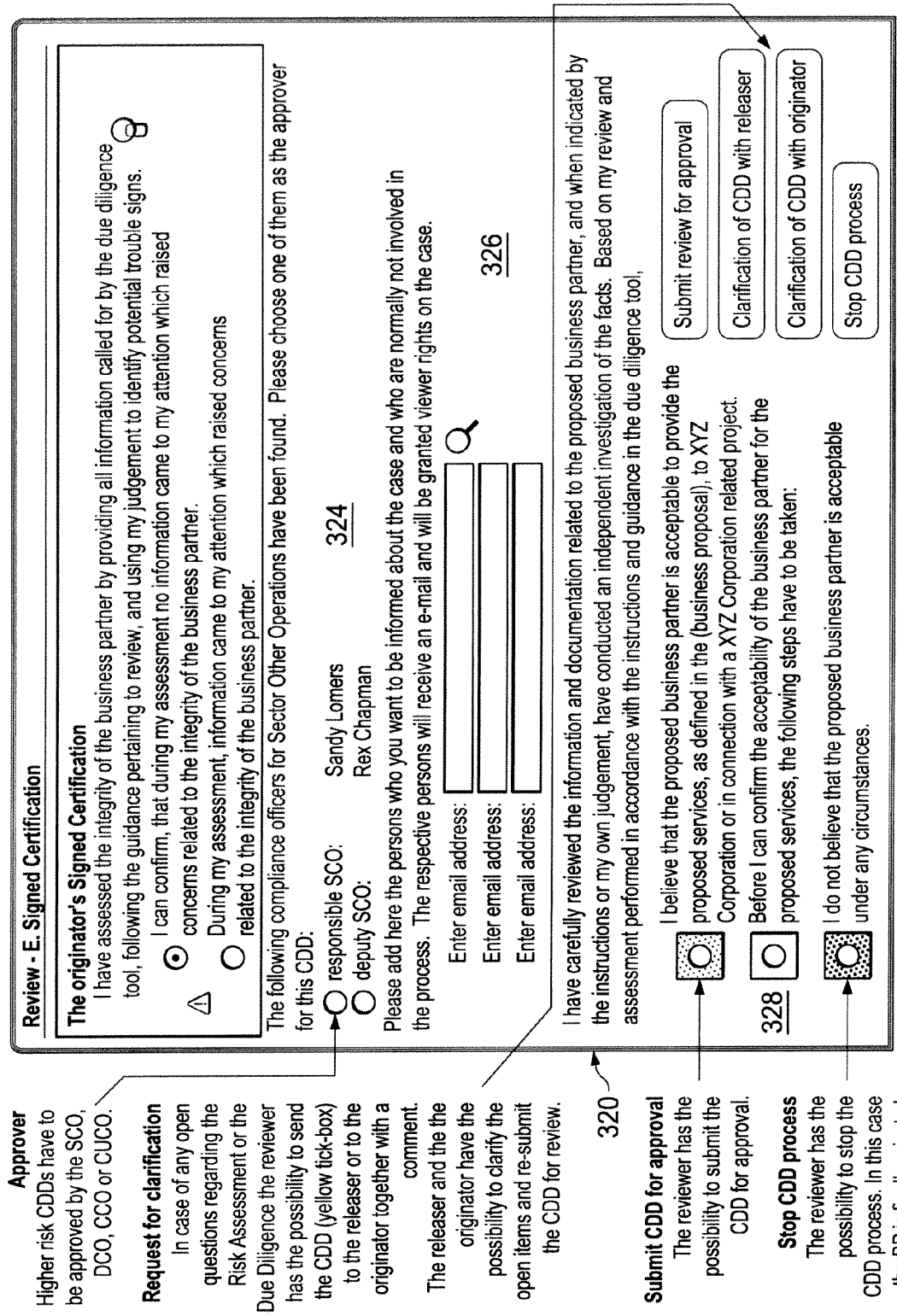
Figure 28:

As discussed above, the example approval phase screenshots correspond to a "higher-level" risk class. Thus, as previously discussed with reference to FIG. 2B, the three processes of the approval phase—release, review, and approve—must be performed by three separate individuals. Namely, the due diligence is released by a first individual (e.g., a local manager), reviewed by a second individual (e.g., RCO or deputy), and approved by a third individual (e.g., SCO, DCO, CCO, CUCO, or deputy). The following screenshots reflect this "higher-level" risk class approval phase. FIGS. 22-24 illustrate the release step, FIGS. 25-26 illustrate the review step, and FIGS. 27-28 illustrate the approval step.

FIGS. 22-24 illustrate an example release step screen 300, which may be accessed by any of the one or more releasers identified by the originator, e.g., by clicking on a link provided in a notification email, as discussed above. The originator is not authorized to release the due diligence for review; thus, the originator only has read-only access to release step screen 300 (and the approval screen).

Release step screen 300 may include key data overview 222 (first discussed above regarding FIG. 13), a "show summary report" button 301, a list of authorized releasers 302, a history log 304, a "select reviewer" area 306, a "cc" function 308, and a due diligence release decision area 310.

The releaser may click "show summary report" button 301 to access a summary report of all data entered by the originator, including key data, questionnaire responses, uploaded/linked documents, etc. List of authorized releasers 302 may include each authorized releaser identified by the originator (see FIG. 21). History log 304 may include every action undertaken by the releaser(s), which is automatically updated as appropriate. "Select reviewer" area 306 allows the releaser to select the reviewer (an RCO or deputy RCO) from a list of one or more possible reviewers. The list of possible reviewers is automatically generated by BPCDD tool 18 based on the business group entered by the originator during the key data entry (see FIG. 12). BPCDD tool 18 may access a database identifying individuals having review authority for the particular business group, e.g., an RCO and deputies (if any) corresponding to that particular business group. The releaser may then select a desired reviewer from the automatically identified RCO and/or deputies. The "cc" function 308 allows the releaser to define up to three persons to be informed about the due diligence process. These persons will receive an e-mail notification and be granted viewer rights to the due diligence.

Due diligence release decision area 310 provides the releaser three decision options regarding the due diligence:

(a) The releaser may release the due diligence for review by clicking "Release CDD for review," which advances the process to the review step of the approval phase.

(b) The releaser may submit a request for clarification. If the releaser clicks "Clarification of CDD with originator," a comments box opens in which the releaser can enter comments to send to the originator. The due diligence, along with the releaser's comments, are then sent back to the originator (e.g., by e-mail notification), and the originator may then clarify any open items and re-submit the due diligence for release. The releaser may then release the due diligence, stop the due diligence process (discussed below), or request further clarification from the originator.

(c) The releaser may stop the due diligence process by clicking "Stop CDD process," e.g., in the case of any doubtful findings regarding the potential business partner.

As discussed above, if the releaser elects to release the due diligence for review, the process advances to the review step of the approval phase. FIGS. 25-27 illustrate an example review step screen 320, which may be accessed by the reviewer (RCO or deputy RCO) selected by the releaser, as discussed above. The originator and the releaser are not authorized to review the due diligence, and instead have read-only access (at least in the illustrated case of a higher-level risk class where the releaser and reviewer are different individuals).

Review step screen 320 includes an identification of the approver 321, a data review area 322, an approver selection area 324, a "cc" function 326, and a due diligence review decision area 328. Data review area 322 presents all or portions of the data entered by the originator, such as key data, risk assessment data, and due diligence questionnaire responses. The approver selection area 324 allows the reviewer to select the approver from one or more possible approvers (e.g., SCO, DCO, CCO, CUCO, or deputy). The list of possible approvers may be automatically generated by BPCDD tool 18 based on the sector, division, and/or business group data entered by the originator during the key data entry (see FIG. 12). The reviewer may then select a desired approver from the automatically identified list of possible approvers. For example:

(a) If the business partner will be working for a specific sector but not a specific division within that sector, during the key data entry phase the originator may indicate such in key data entry screen 200 (FIG. 12). For example, the originator may select the specific sector in the sector field, and select an "all divisions" or "performed on the sector level" option provided in the division field. In response, for facilitating selection of the approver, BPCDD tool 18 accesses a database to identify the individual(s) having approval authority at the sector level—e.g., the sector compliance officer (SCO) and/or deputy SCO(s) for the selected sector. The reviewer may then select an approver from these identified individual(s).

(b) If the business partner will be working for a specific sector and a specific division within that sector, during the key data entry phase the originator may select the sector and the division in key data entry screen 200 (FIG. 12). In response, to facilitate the reviewer's selection of the approver, BPCDD tool 18 accesses a database to identify the individual(s) having approval authority at the division level—e.g., the division compliance officer (DCO) and/or deputy DCO(s) for the selected division. The reviewer may then select an approver from these identified individual(s).

(c) If the business partner will not be working for a specific sector (e.g., where the business partner is law firm), during the key data entry phase the originator may indicate such in key data entry screen 200 (FIG. 12). For example, the originator may select an "all sectors" or "performed on the business group level" option provided in the sector field. In response, to facilitate the reviewer's selection of the approver, BPCDD tool 18 accesses a database to identify the individual(s) having approval authority at the business group level—e.g., the chief compliance officer (CCO) and/or deputy CCO(s) for the business group entered by the originator. The reviewer may then select an approver from these identified individual(s).

(d) If the business partner will be working for one of a predefined group of "special" sectors (e.g., real estate, financial service, or information systems), during the key data entry phase the originator may select the sector and (if appropriate) the division in key data entry screen 200 (FIG. 12). In response, to facilitate the reviewer's selection of the approver, BPCDD tool 18 the BPCDD tool will access a database to identify the individual(s) having approval authority for the "special" sectors—e.g., the corporate units compliance officer (CUCO) and/or deputy CUCO(s) for the business group entered by the originator. The reviewer may then select an approver from these identified individual(s).

The "cc" function 326 allows the reviewer to define up to three persons to be informed about the due diligence process. These persons will receive an e-mail notification and be granted viewer rights to the due diligence.

Due diligence review decision area 328 provides the reviewer three decision options regarding the due diligence:

(a) The reviewer may submit the due diligence for approval by clicking "Submit review for approval," which advances the process to the approval step of the approval phase.

(b) The reviewer may submit a request for clarification from the originator, the releaser, or both. If the reviewer clicks "Clarification of CDD with originator" or "Clarification of CDD with releaser," a comments box opens in which the reviewer can enter comments to send to the originator or releaser. The due diligence, along with the reviewer's comments, are then sent back to the originator or releaser (e.g., by e-mail notification), and the originator or releaser may then clarify any open items and re-submit the due diligence for review. The reviewer may then submit the due diligence for approval, stop the due diligence process (discussed below), or request further clarification from the originator and/or releaser.

(c) The reviewer may stop the due diligence process by clicking "Stop CDD process," e.g., in the case of any doubtful findings regarding the potential business partner.

As discussed above, if the reviewer elects to submit the due diligence for approval, the process advances to the approval step of the approval phase. FIGS. 27-28 illustrate an example approval step screens 340 and 350, which may be accessed by the approver (SCO, DCO, CCO, CUCO, or deputy) selected by the reviewer, as discussed above. The originator, releaser, and reviewer are not authorized to approve the due diligence, and instead have read-only access (at least in the illustrated case of a higher-level risk class where the releaser, reviewer, and approver are all different individuals).

Approval step screen 340 includes an identification of the approver 342, a "cc" function 344, and a due diligence approval decision area 346. The "cc" function 344 allows the approver to define up to three persons to be informed about the due diligence process. These persons will receive an e-mail notification and be granted viewer rights to the due diligence.

Due diligence approval decision area 346 provides the approver three decision options regarding the due diligence:

(a) The approver may approve the due diligence by clicking "Approve."

(b) The approver may submit a request for clarification from the originator, the releaser, or both. If the approver clicks "Clarification of CDD with originator," "Clarification of CDD with releaser," or "Clarification of CDD with reviewer," a comments box opens in which the approver can enter comments to send to the originator, releaser, or reviewer. The due diligence, along with the reviewer's comments, are then sent back to the originator, releaser, or reviewer (e.g., by e-mail notification), and the originator, releaser, or reviewer may then clarify any open items and re-submit the due diligence for approval. The approver may then approve the due diligence, stop the due diligence process (discussed below), or request further clarification from the originator, releaser, and/ or reviewer.

(c) The approver may stop the due diligence process by clicking "Stop CDD process," e.g., in the case of any doubtful findings regarding the potential business partner.

FIG. 28 illustrates a post-approval screen 350 for a business partner compliance due diligence that has been approved. E-mail notifications indicating the final decision of the approver are sent to the originator and all other involved parties. An approved business partner compliance due diligence may be valid for some predetermined time period determined by the contracting entity (e.g., two years), after which the business partner compliance due diligence must be re-performed.

In addition to the due diligence process discussed above, in some embodiments, BPCDD tool 18 may allow the reuse of a due diligence analysis (or portions thereof) for a business partner if that business partner is later analyzed as a potential business partner for a subsequent project. For example, suppose a due diligence for a particular business partner is performed as discussed above, including performing a risk assessment to determine a risk class ("first risk class") for the particular business partner. If the same business partner needs to be analyzed for a later project (i.e., a second due diligence analysis for a different group, sector, division, etc. of the contracting entity, or for a now work scope for the business partner), BPCDD tool 18 may allow at least a portion of the first due diligence analysis (e.g., all/portions of the due diligence questionnaire phase and/or the approval phase) to be reused for the second analysis. For example, during the second due diligence analysis, BPCDD tool 18 may guide an originator (which may be the same originator or a different originator as the first due diligence analysis) through the risk assessment phase to determine a risk class ("second risk class"). BPCDD tool 18 may then compare the second risk class with the previously determined first risk class. If the second risk class indicates a lower or similar level of risk as the first risk class, BPCDD tool 18 may (a) allow some or all of the due diligence questionnaire responses from the first due diligence to be automatically reused for the subsequent analysis and/or (b) allow the approval phase decisions from the first due diligence to be automatically reused for the subsequent analysis. BPCDD tool 18 may automatically retrieve due diligence questionnaire responses and/or approval decisions from the first due diligence analysis and import such into the second due diligence analysis. Thus, the originator of the second due diligence analysis may avoid unnecessarily duplicating all or portions of the due diligence questionnaire phase and/or the approval phase for the business partner.

FIGS. 29-36 illustrate example screenshots generated by BPCDD tool 18 for assisting a user with the "due diligence reuse" function discussed above, according to one embodiment of the invention.

FIG. 29 illustrates example screenshots showing two different options for an originator to initiate a due diligence reuse process for an existing business partner (i.e., a business partner previously entered into BPCDD tool 18). The first option is, shown in screen 140 (previously shown in FIG. 7), allows the originator to search for an existing business partner in the "search business partner" screen, using any of a variety of search fields. Once the desired existing business partner is located, the originator can click on a "new CDD" icon 370 to initiate a new due diligence for the existing business partner. The second option, shown at screen 170 (previously shown in FIGS. 10-11), allows the originator to initiate a new due diligence for the existing business partner in the business partner key data entry screen, by clicking a "new compliance due diligence" button 380.

After initiating the new due diligence for the existing business partner, BPCDD tool 18 prompts the originator to enter key data regarding the business group, sector, division, etc. of the contracting entity that the business partner will be working for, and the scope of the work to be provided by the business partner. FIG. 30 illustrates an example due diligence key data entry screen 400, which is the same or similar as key data entry screen 200 shown above in FIG. 12. After completing the key data entry, the originator may save the data by pressing the "save" button 402. The originator may then advance the process by clicking the "risk assessment" button 404. The originator may then complete a new risk assessment for the existing business partner and determine a new risk class (e.g., lower-risk, medium-risk, or higher-risk), similar to the process discussed above regarding FIGS. 15-17. One or more of the originator's answers for the risk assessment may be different than the answers provided for the original risk assessment, as the new analysis may concern a different business group of the contracting entity and/or a different scope of work for the business partner.

After completing the new risk assessment for the existing business partner, BPCDD tool 18 compares the new risk class with the original risk class (from the original risk assessment). If the new risk class indicates the same or lower risk than the original risk class, BPCDD tool 18 presents the originator with an option to apply for a due diligence reuse, as discussed below with reference to FIG. 31. If the new risk class indicates a higher risk than the original risk class, BPCDD tool 18 does not offer the option for a due diligence reuse, and instead requires the originator to perform the complete due diligence questionnaire from scratch. BPCDD tool 18 may select the due diligence questionnaire (or particular questions for the due diligence questionnaire) based on the new risk class, such as discussed above regarding FIG. 18.

FIG. 31 illustrates the end of an example risk assessment screen 430, including a reuse application tool 432 displayed to the originator upon completing of the risk assessment for the existing business partner. The reuse application tool 432 allows the originator to select a compliance officer of the relevant business group (i.e., the business group identified during the key data entry shown at FIG. 30) and explain the reasons for requesting the due diligence reuse. The originator may then click the "request reuse" button 434 to initiate the reuse request. Alternatively, the originator may click on the due diligence tab 436 to continue to the due diligence questionnaire without requesting a due diligence reuse.

Figure 34:
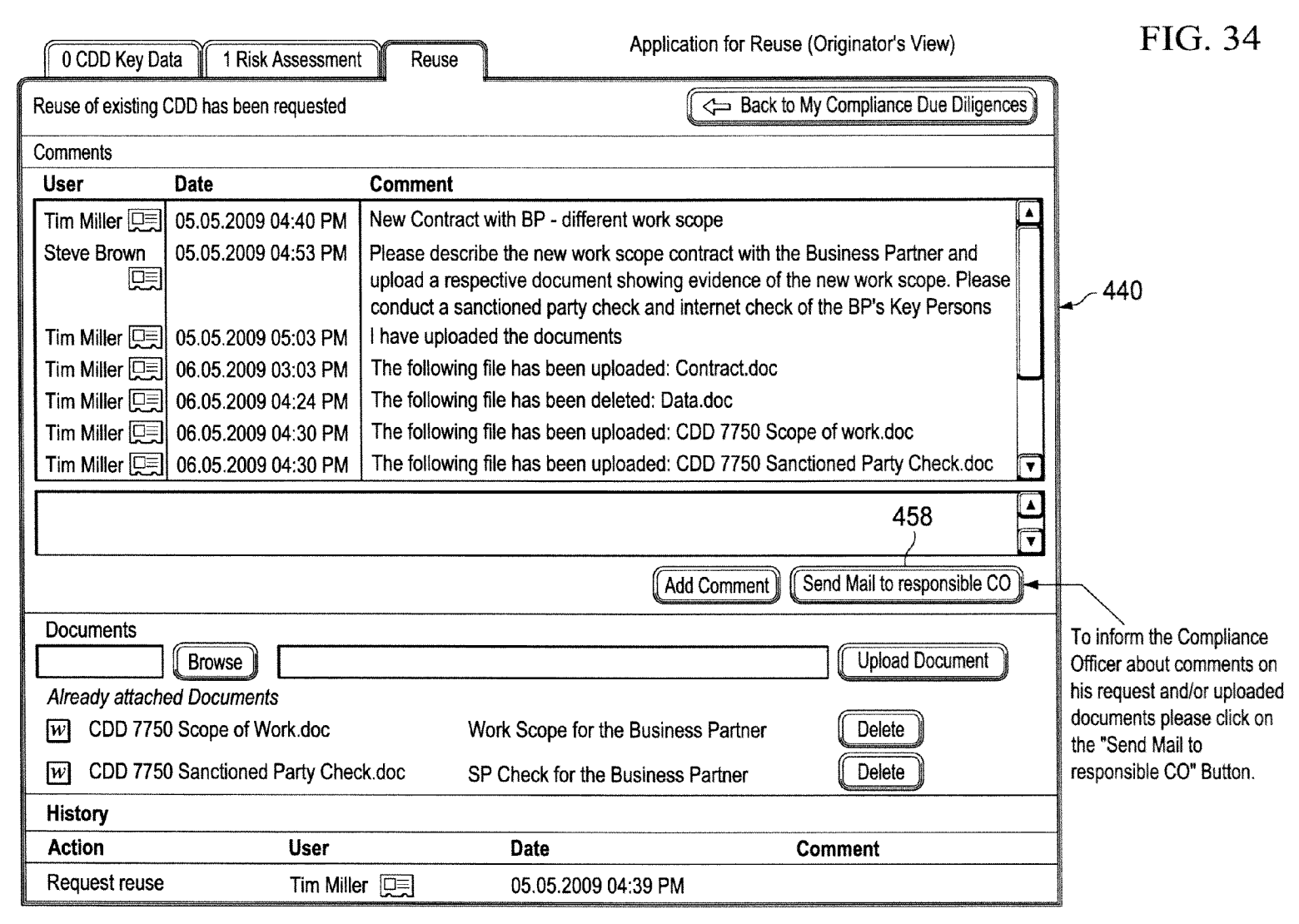

Upon the originator's selection of "request reuse" button 434, BPCDD tool 18 sends the due diligence reuse request to the selected compliance officer (CO). For example, BPCDD tool 18 may send the CO an email with a link to log in to a CO reuse analysis screen of BPCDD tool 18, such as example screen 520 shown in FIG. 35. In addition, as shown in FIG. 34, BPCDD tool 18 may present a reuse screen 440 including a revised workflow status in the key data overview 222 (previously discussed regarding FIG. 13) to indicate "reuse requested," and a reuse tab 450 indicating that the reuse section is available.

Figure 33:

At this point, the originator may wait for the CO to review the reuse request. If the CO has requested additional information before deciding on the reuse request (e.g., by entering comments into comment section 524 shown in FIG. 35), the CO's request may appear in comment section 452 of reuse screen 440, as shown in FIG. 33. The originator may receive an email notification (generated by BPCDD tool 18) to notify the originator of the CO's comments. The originator may then respond to the CO's request by (a) entering comments into comments/answer section 454 and/or (b) uploading one or more documents relevant to the CO's request, using the document search/upload tool 456. After entering comments and/or uploading one or more documents, the originator may click on "send mail to responsible CO" button 458 shown in FIG. 34 in order to notify the CO (e.g., by email notification) of the response. This process of communications between the CO and the originator may continue until the CO has sufficient data to make an approval decision.

FIG. 35 illustrates an example screen 520 displayed to the compliance officer selected by the originator for approving/disapproving the due diligence reuse request. Screen 520 includes key data overview 222, comments section 524, a "change CO" button 526, an existing due diligence information section 528, and an approval decision section 530. As discussed above, the CO may communicate comments to the originator by entering comments into comments section 524. These comments are then visible to the originator in comment area 452 (FIG. 33). "Change CO" button 526 allows the CO to assign the reuse approval decision to another CO authorized for that business group (in this example, group 7092). Existing due diligence information section 528 indicates information about existing due diligences for the business partner. If there is more than one existing due diligence for the business partner, the CO must select the particular due diligence to work on. Information section 528 may include icons 532 allowing the CO to access an existing due diligence, including an approval report for the existing due diligence.

Approval decision section 530 allows the CO to select his/her approval decision for the originator's reuse request. In this example, the CO may select from three options:

(1) Approve reference: BPCDD tool 18 links the new due diligence to the existing due diligence, such that the new due diligence is automatically approved and valid as long as the existing due diligence is valid. This is the highest level of approval.

(2) Approve copy: BPCDD tool 18 copies non-time-sensitive due diligence questionnaire responses from the existing due diligence to the new due diligence, and send the originator an email notification. BPCDD tool 18 then requires the originator to complete/update the due diligence questionnaire and submit the due diligence for release, as the due diligence is required to pass through the full approval phase under this option. If the due diligence is approved (after the full approval phase), the due diligence is valid for a predefined time period (e.g., two years) independent of the validity of the previous due diligence for the same business partner.

(3) Disapprove copy and reference. BPCDD tool 18 requires the originator to complete the due diligence questionnaire phase from scratch, and submit the due diligence for release (approval phase).

Figure 36:
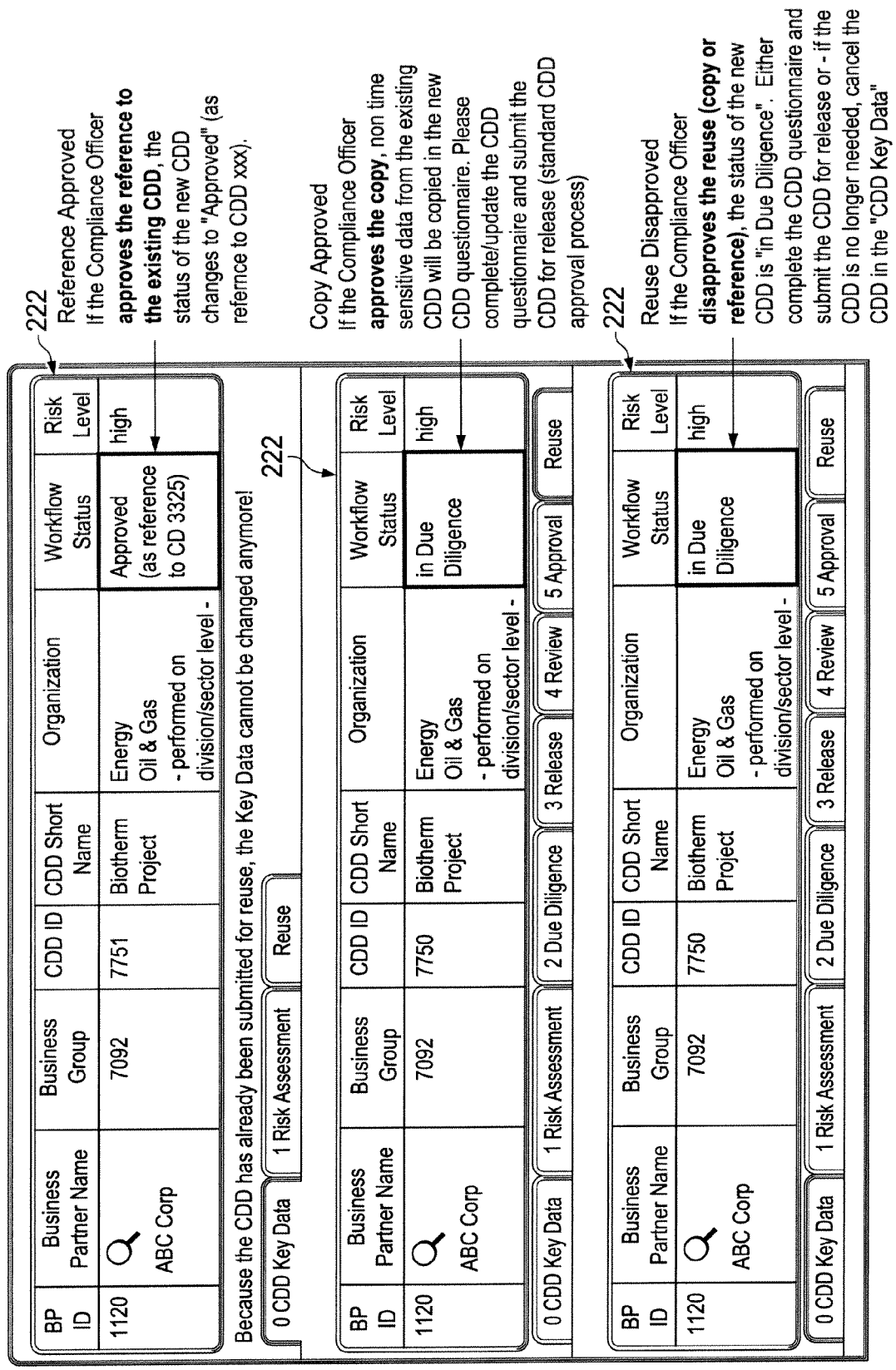

When the CO makes his/her approval/disapproval selection regarding the reuse request, BPCDD tool 18 sends the originator a notification email including a link to a decision results screen. The decision results screen indicates the CO's approval/disapproval decision regarding the reuse request in the "workflow status" section of the key data overview 222, as shown in FIG. 36.

It will be appreciated that systems, methods, and techniques disclosed herein may be similarly applied in other contexts. Additionally, it should be understood that various changes, substitutions and alterations can be made herein without departing from the spirit and scope of the disclosure as illustrated by the following claims.

What is claimed is:

1. Software stored in non-transitory computer-readable media and executable by a processor for facilitating a due diligence analysis of a potential business partner of a business entity, the software including instructions for:

receiving key data regarding a potential business partner;

facilitating an analysis of the potential business partner, including:

receiving risk-related data from a user regarding risks associated with the potential business partner, at least a portion of the received risk-related data having corresponding predetermined point values;

calculating a total point value for the received risk-related data;

automatically determining a point-based risk class for the potential business partner from a plurality of predefined risk classes based at least on the calculated total point value for the received risk-related data;

automatically selecting from a plurality of predefined sets of due diligence questions, each corresponding to a different point-based risk class, a set of due diligence questions corresponding to the automatically determined point-based risk class for the potential business partner; and presenting the selected set of due diligence questions to the user;

receiving due diligence data from the user in response to the set of due diligence questions; and facilitating an approval process for the received due diligence data.

2. A computer-readable media according to claim 1, further comprising:

the approval process including multiple phases;

automatically determining a number of persons required to complete the multiple phases of the approval process based at least on the automatically determined risk class for the potential business partner.

3. A computer-readable media according to claim 2, further comprising: the approval process including at least a first phase and a second phase; automatically determining, based at least on the automatically determined risk class for the potential business partner, whether a single person may complete both the first and second phases or whether different persons must complete the first and second phases.

4. A computer-readable media according to claim 2, wherein:

the approval process includes a release step, a review step, and an approval step;

automatically determining the point-based risk class for the potential business partner comprises determining a risk class of lower risk, medium risk, or higher risk; and if the risk class is determined as lower risk, facilitating the identification of a single person for completing all three of the release, review, and approval steps;

if the risk class is determined as medium risk, facilitating the identification of a first person for completing the release step and a second person for completing the review step and the approval step; and if the risk class is determined as higher risk, facilitating the identification of a first person for completing the release step, a second person for completing the review step, and a third person for completing the approval step.

5. A computer-readable media according to claim 1, further comprising: facilitating an integrity check regarding the potential business partner, including receiving results of an Internet search regarding the potential business partner; and automatically determining the risk class for the potential business partner based at least on the received risk-related data and the results of the integrity check.

6. A computer-readable media according to claim 5, wherein automatically determining the risk class for the potential business partner based at least on the received risk-related data and the results of the integrity check comprises automatically assigning a higher risk class to the potential business partner based on particular results of the integrity check, regardless of the received risk-related data.

7. A computer-readable media according to claim 6, wherein:

receiving risk-related data from the user regarding risks associated with the potential business partner comprises receiving responses to a set of risk-related questions presented to the user;

particular responses to particular risk-related questions have predefined corresponding point values; and automatically determining the point-based risk class for the potential business partner includes calculating a total of point values corresponding to the user's responses to the set of risk-related questions.

8. A computer-readable media according to claim 1, further comprising facilitating a subsequent analysis of the potential business partner, including:

determining a subsequent risk class for the potential business partner based at least on the received risk-related data;

comparing the subsequent risk class with the original risk class; and in response to the determining that the subsequent risk class indicates a lower or same level of risk as the original risk class, allowing at least a portion of the due diligence data received during the original analysis of the potential business partner to be reused for the subsequent analysis of the potential business partner.

9. Logic instructions stored in non-transitory computer-readable media and executable by a processor for facilitating a due diligence analysis of a potential business partner of a business entity, including:

instructions for receiving key data regarding a potential business partner;

instructions for receiving risk-related data from a user regarding risks associated with the potential business partner, at least a portion of the received risk-related data having corresponding predetermined point values;

instructions for calculating a total point value for the received risk-related data;

instructions for automatically determining a point-based risk class for the potential business partner from a plurality of predefined risk classes based at least on the calculated total point value for the received risk-related data;

instructions for automatically selecting from a plurality of predefined sets of due diligence questions, each corresponding to a different point-based risk class, a set of due diligence questions corresponding to the automatically determined point-based risk class for the potential business partner;

instructions for presenting the selected set of due diligence questions to the user;

instructions for receiving due diligence data from the user in response to the set of due diligence questions; and instructions for facilitating an approval process for the received due diligence data.

10. Logic instructions according to claim 9, wherein the approval process includes multiple phases; and including instructions for automatically determining a number of persons required to complete the multiple phases of the approval process based at least on the automatically determined risk class for the potential business partner.

11. Logic instructions according to claim 10, wherein the approval process includes at least a first phase and a second phase; and including instructions for automatically determining, based at least on the automatically determined risk class for the potential business partner, whether a single person may complete both the first and second phases or whether different persons must complete the first and second phases.

12. Logic instructions according to claim 10, wherein the approval process includes a release step, a review step, and an approval step, and wherein automatically determining the point-based risk class for the potential business partner comprises determining a risk class of lower risk, medium risk, or higher risk, and including:

instructions for facilitating the identification of a single person for completing all three of the release, review, and approval steps if the risk class is determined as lower risk;

instructions for facilitating the identification of a first person for completing the release step and a second person for completing the review step and the approval step if the risk class is determined as medium risk; and instructions for facilitating the identification of a first person for completing the release step, a second person for completing the review step, and a third person for completing the approval step if the risk class is determined as higher risk.

13. Logic instructions according to claim 9, further including:

instructions for facilitating an integrity check regarding the potential business partner, including receiving results of an Internet search regarding the potential business partner; and instructions for automatically determining the risk class for the potential business partner based at least on the received risk-related data and the results of the integrity check.

14. Logic instructions according to claim 13, wherein automatically determining the risk class for the potential business partner based at least on the received risk-related data and the results of the integrity check comprises automatically assigning a higher risk class to the potential business partner based on particular results of the integrity check, regardless of the received risk-related data.

15. Logic instructions according to claim 14, wherein:

receiving risk-related data from the user regarding risks associated with the potential business partner comprises receiving responses to a set of risk-related questions presented to the user;

particular responses to particular risk-related questions have predefined corresponding point values; and automatically determining a risk class for the potential business partner includes calculating a total of point values corresponding to the user's responses to the set of risk-related questions.

16. Logic instructions according to claim 9, further comprising instructions for facilitating a subsequent analysis of the potential business partner, including:

instructions for determining a subsequent risk class for the potential business partner based at least on the received risk-related data;

instructions for comparing the subsequent risk class with the original risk class; and instructions for allowing at least a portion of the due diligence data received during the original analysis of the potential business partner to be reused for the subsequent analysis of the potential business partner in response to the determining that the subsequent risk class indicates a lower or same level of risk as the original risk class.

17. Software stored in non-transitory computer-readable media and executable by a processor for facilitating a due diligence analysis of a potential business partner of a business entity, the software including instructions for:

facilitating a first due diligence analysis of a potential business partner, including:

receiving first risk-related data regarding the potential business partner;

automatically determining a first risk class for the potential business partner based at least on the first risk-related data;

receiving first due diligence data;

facilitating an approval process of the received first due diligence data; and facilitating a second, subsequent due diligence analysis of the potential business partner, including:

receiving second risk-related data regarding risks associated with the potential business partner;

automatically determining a second risk class for the potential business partner based at least on the second risk-related data;

comparing the second risk class to the first risk class;

based on a determination that the second risk class is the same or lower than the first risk class, allowing at least a portion of the first due diligence data to be reused for the second due diligence analysis;

receiving from a first user a request for approval to reuse the first due diligence data for the second due diligence analysis;

communicating the reuse approval request to a second user;

receiving from the second user a response to the reuse approval request;

receiving second due diligence data including the reused first due diligence data; and facilitating an approval process of the second due diligence data.

18. A computer-readable media according to claim 17, further comprising providing the second user a selectable option for linking the second due diligence to the first due diligence such that the second due diligence is automatically approved and valid as long as the first due diligence is valid.

19. Software stored in non-transitory computer-readable media and executable by a processor for facilitating a due diligence analysis of a potential business partner of a business entity, the software including instructions for:

facilitating a first due diligence analysis of a potential business partner, including:

receiving first risk-related data regarding the potential business partner;

automatically determining a first risk class for the potential business partner based at least on the first risk-related data;

receiving first due diligence data, including responses to a first due diligence questionnaire;

facilitating an approval process of the received first due diligence data; and facilitating a second, subsequent due diligence analysis of the potential business partner, including:

receiving second risk-related data regarding risks associated with the potential business partner;

automatically determining a second risk class for the potential business partner based at least on the second risk-related data;

comparing the second risk class to the first risk class;

based on a determination that the second risk class is the same or lower than the first risk class, allowing one or more of the previously received responses to the first due diligence questionnaire to be reused for the second due diligence analysis;

receiving second due diligence data, including automatically using the one or more of the previously received responses to the first due diligence questionnaire as responses for a second due diligence questionnaire; and facilitating an approval process of the second due diligence data.

* * * * *